(12) United States Patent
Cho et al.

(10) Patent No.: US 9,348,142 B2
(45) Date of Patent: May 24, 2016

(54) DETACHABLE HEAD MOUNT DISPLAY DEVICE AND METHOD FOR CONTROLLING THE SAME

(71) Applicant: LG ELECTRONICS INC., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 14/212,962

(22) Filed: Mar. 14, 2014

(65) Prior Publication Data

US 2015/0199064 A1    Jul. 16, 2015

(30) Foreign Application Priority Data

Jan. 15, 2014  (KR) .......................... 10-2014-0005115

(51) Int. Cl.
| | |
|---|---|
| *G09G 5/00* | (2006.01) |
| *G02B 27/01* | (2006.01) |
| *G06F 3/038* | (2013.01) |
| *G06F 3/0354* | (2013.01) |

(52) U.S. Cl.
CPC .......... *G02B 27/017* (2013.01); *G02B 27/0176* (2013.01); *G06F 3/038* (2013.01); *G06F 3/03547* (2013.01); *G02B 2027/015* (2013.01); *G02B 2027/0178* (2013.01); *G06F 2203/0339* (2013.01)

(58) Field of Classification Search
CPC ............ G06F 3/011–3/015; G06F 2203/0339; G02B 27/0093; G02B 27/01–27/0189
USPC ....................... 345/7–9; 359/13, 630
See application file for complete search history.

(56) References Cited

U.S. PATENT DOCUMENTS

| | | | |
|---|---|---|---|
| 2005/0147129 A1* | 7/2005 | Maehara et al. ............. | 370/486 |
| 2010/0073262 A1 | 3/2010 | Matsumoto | |
| 2010/0079356 A1 | 4/2010 | Hoellwarth | |
| 2010/0164840 A1 | 7/2010 | Yamamoto | |
| 2012/0299870 A1 | 11/2012 | Chi et al. | |
| 2013/0181888 A1 | 7/2013 | Kuriya et al. | |
| 2013/0214998 A1* | 8/2013 | Andes ................. | G02B 27/017 345/8 |

FOREIGN PATENT DOCUMENTS

| | | |
|---|---|---|
| JP | 5030595 B2 | 9/2012 |
| JP | 5126682 B2 | 1/2013 |
| JP | 2013-150118 A | 8/2013 |

* cited by examiner

*Primary Examiner* — Stephen Sherman

(74) *Attorney, Agent, or Firm* — Birch, Stewart, Kolasch & Birch, LLP

(57) ABSTRACT

A micro-head mounted display device that may be detachably affixed to eye-glasses and a method for controlling the same are disclosed. A method for controlling a detachable HMD device, detecting that the HMD device is affixed to eye-glasses, acquiring identification information of the eye-glasses, acquiring a look up table related to the identification information, receiving an input signal generated when the eye-glasses to which the HMD device is affixed are touched, from the sensor unit, acquiring a control input related to the input signal from the look up table, and performing a function corresponding to the control input.

19 Claims, 19 Drawing Sheets

| identification information | coating material | conductivity | length coated with conductive material | ... |
|---|---|---|---|---|
| first eye-glasses | Aluminum | o | entire eye-glasses | ... |
| second eye-glasses | carbon nanotube | o | right temple of eye-glasses | ... |
| . | . | . | . | ... |
| . | . | . | . | ... |
| . | . | . | . | ... |
| . | . | . | . | ... |

LOOK UP TABLE 650

| input signal | control input |
|---|---|
| ～～～ | one-click |
| ～～～ | double click |
| ～～～ | slide input |

THE SECOND LOOK UP TABLE 820

| input signal | control input |
|---|---|
| 830 ～〰〰〰〰 | music play |
| 840 ～〰〰〰〰 | music stop |
| 850 ～〰〰〰〰 | forward to next music |

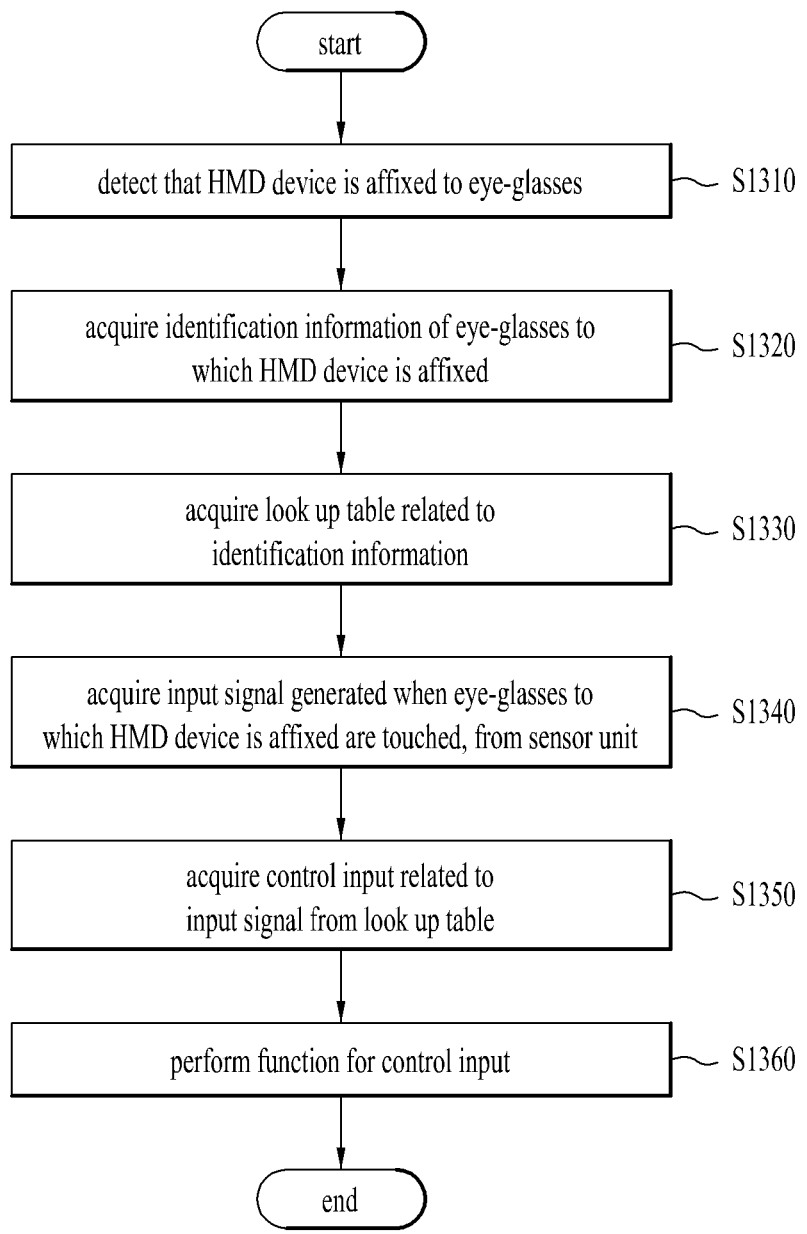

DETACHABLE HEAD MOUNT DISPLAY DEVICE AND METHOD FOR CONTROLLING THE SAME

This application claims the benefit of the Korean Patent Application No. 10-2014-0005115, filed on Jan. 15, 2014, which is hereby incorporated by reference as if fully set forth herein.

BACKGROUND OF THE DISCLOSURE

1. Field of the Disclosure

The present specification relates to a head mounted display device, and more particularly, to a micro-head mounted display device that may be detachably affixed to eye-glasses and a method for controlling the same.

2. Discussion of the Related Art

A head mounted display (hereinafter, referred to as 'HMD') device allows a user to wear on his/her head like eye-glasses in accordance with its lightweight tendency. Visual information displayed in the HMD device may be provided to the user.

However, in case of a user who wears eye-glasses, there is inconvenience in that the user should take off his or her eye-glasses to wear the HMD device. Also, users who use the HMD device may have their respective eyesight different from one another. Moreover, the HMD device may be different from eye-glasses worn by a user in view of size and shape. Accordingly, if visual information displayed in the HMD device is provided to the user, the user may suffer inconvenience in receiving the visual information due to non-focusing on the visual information which is displayed. Also, if the user wears the HMD device, since the HMD device has a size and a shape different from those of eye-glasses worn by the user, the user may suffer inconvenience in wearing the HMD device.

Also, if the user carries the HMD device, there may be inconvenience in that it is difficult to manufacture the HMD device at a size of eye-glasses, whereby it is difficult for the user to carry the HMD device.

In this respect, it is required that the HMD device should be manufactured at a micro size to be detachably affixed to eye-glasses of a user and provide visual information considering features of the eye-glasses of the user.

SUMMARY OF THE DISCLOSURE

Accordingly, the present specification is directed to a detachable HMD device and a method for controlling the same, which substantially obviate one or more problems due to limitations and disadvantages of the related art.

According to one embodiment, an object of the present specification is to provide a method for detecting that an HMD device is affixed to eye-glasses and acquiring identification information of the eye-glasses.

Also, according to one embodiment, another object of the present specification is to provide a method for enabling an HMD device to perform a function by using a look up table acquired on the basis of identification information of eye-glasses.

Also, according to one embodiment, still another object of the present specification is to provide a method for acquiring an input signal generated when eye-glasses to which an HMD device is affixed are touched.

Also, according to one embodiment, further still another object of the present specification is to provide a method for performing a function on the basis of a length of an input signal sensing area where a touch input signal of eye-glasses to which an HMD device is affixed is acquired.

Also, according to one embodiment, further still another object of the present specification is to provide a method for performing a function on the basis of a position where an HMD device is affixed to eye-glasses.

Also, according to one embodiment, further still another object of the present specification is to provide a method for performing authentication at an external server on the basis of identification information of eye-glasses to which an HMD device is affixed.

Also, according to one embodiment, further still another object of the present specification is to provide a method for adjusting a focus of an HMD device on the basis of a distance between the HMD device and eyes of a user who wears the HMD device.

Also, according to one embodiment, further still another object of the present specification is to provide a method for displaying an indicator on eye-glasses to which an HMD device is affixed.

Also, according to one embodiment, further still another object of the present specification is to provide a method for coating a frame surface of eye-glasses, to which an HMD device is affixed, with a material having conductivity.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a detachable head mounted display (HMD) device comprises a display unit configured to display visual information; a detached sensor unit configured to detect whether the HMD device has been affixed to eye-glasses; a sensor unit configured to detect an input signal generated when the eye-glasses to which the HMD device is affixed are touched; and a controller configured to control the display unit, the detached sensor unit and the sensor unit, wherein the controller acquires identification information of the eye-glasses if the controller detects that the HMD device is affixed to the eye-glasses, acquires a look up table related to the identification information, receives the detected input signal from the sensor unit, acquires a control input related to the input signal from the look up table, and performs a function corresponding to the control input.

In another aspect of the present specification, a method for controlling a detachable head mounted display (HMD) device comprises the steps of detecting that the HMD device is affixed to eye-glasses; acquiring identification information of the eye-glasses; acquiring a look up table related to the identification information; receiving an input signal generated when the eye-glasses to which the HMD device is affixed are touched, from the sensor unit; acquiring a control input related to the input signal from the look up table; and performing a function corresponding to the control input.

According to the present specification, the HMD device may detachably be affixed to eye-glasses.

Also, according to the present specification, the HMD device may detect that it is affixed to eye-glasses, acquire identification information of the eye-glasses, and adjust a look up table in accordance with the identification information.

Also, according to the present specification, the HMD device may perform a function for controlling a user interface by using the look up table.

Also, according to the present specification, the HMD device may perform a function on the basis of a length of an input signal sensing area where a touch input signal of eye-glasses to which an HMD device is affixed may be acquired.

Also, according to the present specification, the HMD device may perform a function on the basis of a position where the HMD device is affixed to eye-glasses.

Also, according to the present specification, the HMD device may perform authentication at an external server on the basis of the identification information of eye-glasses to which the HMD device is affixed.

Also, according to the present specification, the HMD device may adjust its focus on the basis of a distance with eyes of a user who wears the HMD device and provide the user with a clear image.

Also, according to the present specification, the HMD device may display an indicator on eye-glasses to which an HMD device is affixed, whereby the user may easily fix the HMD device to the eye-glasses.

Also, according to the present specification, the HMD device may sense an input signal by coating a frame surface of eye-glasses, to which the HMD device is affixed, with a material having conductivity.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 13 is a flow chart illustrating a method for controlling a detachable HMD device in accordance with one embodiment of the present specification.

DETAILED DESCRIPTION OF THE DISCLOSURE

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

A head mounted display (HMD) device of the present specification may mean a wearable device that may be worn by a body of a user to display visual information. In this case, the HMD device may be a detachable HMD in accordance with the present specification.

Figure 1:
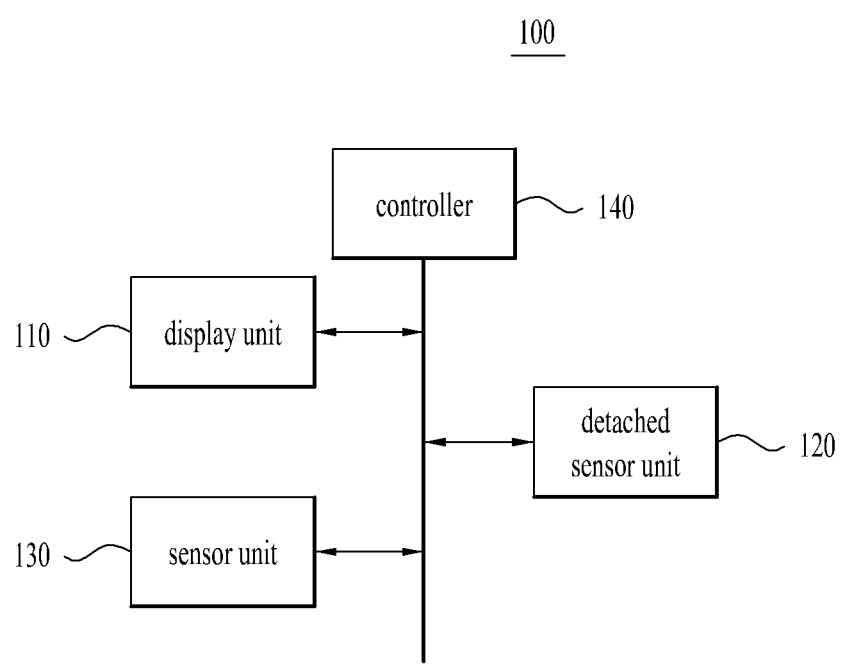
FIG. 1 is a block diagram illustrating an HMD device according to one embodiment of the present specification.

FIG. 1 is a block diagram illustrating an HMD device 100 according to one embodiment of the present specification. The HMD device 100 may include a display unit 110, a detached sensor unit 120, a sensor unit 130, and a controller 140.

The display unit 110 may display virtual information. In this case, the visual information may mean information that may be recognized visually, such as image, text, moving picture, photo, and picture. Also, the display unit 110 may display augmented reality information related to real object. Also, as one example, the display unit 110 may display a stereoscopic image by using a stereoscopic camera. At this time, the display unit 110 may control a position and a distance where visual information is displayed, by considering features of eye-glasses to which the HMD device 100 is affixed and eyesight of a user who wears the eye-glasses. In more detail, the display unit 110 may adjust a position and a distance of the visual information which is displayed, by considering a lens size or thickness of eye-glasses to which the HMD device 100 is affixed, or a distance between eyes of the user who wears the eye-glasses and the HMD device 100. In other words, the HMD device 100 may control a focus of the displayed visual information in accordance with the eye-glasses to which the HMD device 100 is affixed and the user of the eye-glasses. This will be described with reference to FIG. 10. Also, as an example, an optical see-through display panel may be used as the display unit 110.

The detached sensor unit 120 may detect whether the HMD device 100 has been affixed to the eye-glasses. For example, the HMD device 100 may generate an electromagnetic pattern. In more detail, the HMD device 100 may generate various electromagnetic patterns by generating a current and controlling an occurrence period, duration time and strength of the current. At this time, the HMD device 100 may output an electromagnetic pattern at a affixed portion where the HMD device 100 is affixed to the eye-glasses. In this case, the affixed portion means a portion where the HMD device 100 may be affixed to the eye-glasses. In more detail, the HMD device 100 may have a eye-glasses frame shaped groove structure so that the HMD device may be affixed to the eye-glasses. If the HMD device 100 is affixed to the eye-glasses, the HMD device 100 may be attached and affixed to the eye-glasses. If the HMD device 100 is affixed to the eye-glasses, the detached sensor unit 120 may sense variation of the electromagnetic pattern output from the affixed portion. In more detail, the eye-glasses to which the HMD device 100 is affixed may be coated with a material having conductivity. At this time, the material having conductivity may be, but not limited to, a material, such as Cu, Al, Au, or carbon nanotube, which is coated in the eye-glasses to flow a micro current. The detached sensor unit 120 may detect that the HMD device 100 has been affixed to the eye-glasses by sensing that the output electromagnetic pattern is varied by the eye-glasses coated with the conductive material.

Also, the detached sensor unit 120 may detect that the eye-glasses has been affixed to the HMD device 100 by sensing magnetic field varied by the eye-glasses coated with the conductive material.

Also, the detached sensor unit 120 may detect that the HMD device 100 has been affixed to the eye-glasses by using a radio frequency identification (RFID) signal. In more detail, the eye-glasses to which the HMD device 100 is affixed may include an RFID tag. The detached sensor unit 120 may include an RFID reader. The detached sensor unit 120 may identify RFID tag information of the eye-glasses to which the HMD device 100 is affixed, by using the RFID reader, and may detect that the HMD device 100 is affixed to the eye-glasses.

Also, the detached sensor unit 120 may include a bar code reader, and may detect that the HMD device 100 has been affixed to the eye-glasses by using bar code information.

Also, the detached sensor unit 120 may further include a camera unit, and may detect that the HMD device 100 has been affixed to the eye-glasses by using QR code information.

According to the present specification, the detached sensor unit 120 may refer to a sensor unit that may detect that that the HMD device 100 has been affixed to the eye-glasses and is not limited to the aforementioned example.

The sensor unit 130 may detect an input signal generated when the eye-glasses to which the HMD device 100 is affixed is touched. In more detail, the HMD device 100 may be manufactured in a micro shape, and may be used to be affixed to the eye-glasses. At this time, the sensor unit 130 may detect the input signal generated when the eye-glasses to which the HMD device 100 is affixed is touched, and may forward the input signal to the controller 140, whereby the input signal may be used as a control input. As a result, the HMD device 100 may use the input signal generated when the eye-glasses to which the HMD device 100 is affixed is touched as a control input that controls the displayed user interface.

In more detail, the eye-glasses coated with the HMD device 100 may be coated with the conductive material as described above. If the HMD device 100 is affixed to the eye-glasses, the HMD device 100 may apply a micro current to the eye-glasses. At this time, the micro current may flow the portion of the eye-glasses, which is coated with the conductive material. If the HMD device 100 applies the micro current to the eye-glasses, the sensor unit 130 may detect a micro signal varied when the eye-glasses is touched as an input signal. In more detail, if the eye-glasses are touched, the sensor unit 130 may sense that electric conductivity or electromagnetic pattern of the conductive material coated in the eye-glasses is varied, thereby detecting the touched area of the eye-glasses.

Also, as an example, the HMD device 100 may include a first contact point for applying a current and a second contact point for receiving the current applied from the first contact point. As another example, the HMD device 100 may include a current reception unit. At this time, the current reception unit may receive the current applied from the first contact point. In more detail, the current reception unit may include the second contact point. The current reception unit may control an input signal sensing area where the input signal is detected, by controlling the position of the second contact point. This will be described with reference to FIG. 5.

Also, the aforementioned sensors may be included in the HMD device 100 as separate elements, or may be incorporated into at least one element. The detached sensor unit 120 and the sensor unit 130 may be an incorporated sensor unit. The incorporated sensor unit may detect whether the HMD device 100 has been affixed to the eye-glasses simultaneously with the input signal generated when the eye-glasses are touched.

The controller 140 may detect that the HMD device 100 has been affixed to the eye-glasses, and may acquire identification information of the affixed eye-glasses. At this time, the identification information may include feature information on the eye-glasses to which the HMD device 100 is affixed. In more detail, the identification information may include at least one of a type of the eye-glasses, appearance of the eye-glasses, parts of the eye-glasses, a material coated in the eye-glasses, conductivity of the eye-glasses, a length of an area of the eye-glasses coated with a conductive material, a lens size of the eye-glasses, and a thickness of the eye-glasses. In addition, the identification information may include information on the eye-glasses to which the HMD device 100 is affixed. Also, the identification information may be acquired through at least one of the RFID signal, the bar code, and the QR code. Also, as an example, the HMD device 100 may be affixed to the eye-glasses by using the detached sensor unit 120 and at the same time acquire the identification information.

If the controller 140 acquires the identification information, the controller 140 may acquire a look up table related to the identification information on the basis of the identification information. At this time, the look up table may be a set of predetermined values for a given input signal. In more detail, the controller 140 may acquire a control input that performs a function at the user interface which is displayed. At this time, the controller 140 may receive the input signal from the sensor unit 130 and acquire the control input matched with the input signal from the look up table. In other words, the look up table may be a table representing correspondence of the control input corresponding to the input signal. At this time, the look up table may be set differently depending on the acquired identification information. This will be described later with reference to FIG. 6b.

If the input signal is forwarded to the controller 140, the controller 140 may acquire a control input related to the input signal from the look up table. The controller 140 may perform a function of the HMD device 100 in accordance with the control input. At this time, the function may be varied depending on the user interface performed by the HMD device 100. This will be described later with reference to FIGS. 7a to 7c.

Also, the HMD device 100 may further include a storage unit (not shown). The storage unit may store various digital data such as moving pictures, audios, images and applications. According to the present specification, if the HMD device 100 is affixed to the eye-glasses, the controller 140 may further acquire user information of the user of the eye-glasses, and may generate a folder for storing data on the basis of user information. At this time, the user information may be information included in the aforementioned identification information. Also, the user information is separately set by the user of the eye-glasses, and may be information corresponding to the user who uses the eye-glasses.

The controller 140 may store information, data or security information on the function performed by the user of the eye-glasses in a state that the HMD device 100 is affixed to the eye-glasses. In more detail, since the HMD device 100 is detachably affixed to the eye-glasses, various users may use the HMD device 100 in such a manner that the HMD device 100 is affixed to their eye-glasses. At this time, the controller 140 needs to store the function, data or security information performed by the eye-glasses to which the HMD device 100 is affixed, for each user. In other words, the HMD device 100 may identify a plurality of users who use the HMD device 100, from one another. As a result, the detachable HMD device 100 may be used by the plurality of users.

Figure 2:
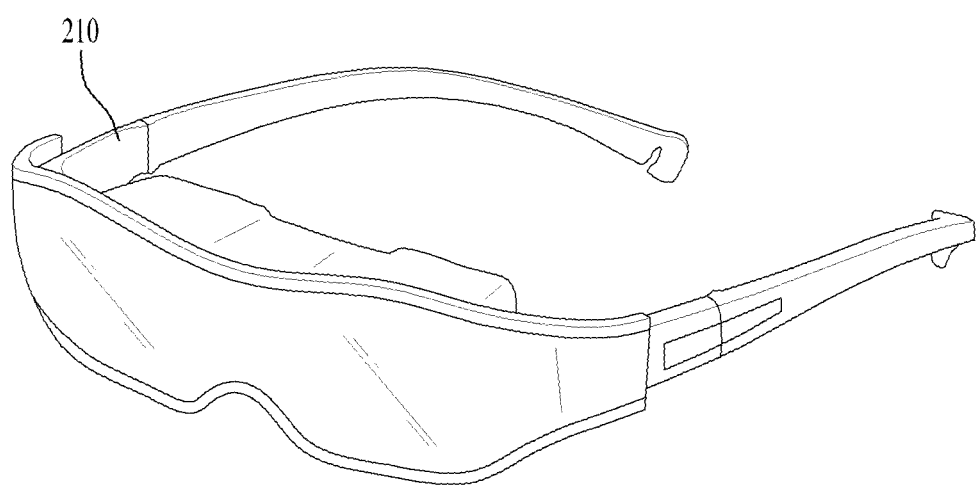
FIG. 2 is a diagram illustrating a non-detachable HMD device according to one embodiment of the present specification.

FIG. 2 is a diagram illustrating a non-detachable HMD 210 device according to one embodiment of the present specification. Referring to FIG. 2, the HMD device 210 may be worn by the user like the eye-glasses. In more detail, the HMD device 210 may be manufactured in a shape of eye-glasses or helmet and then may be worn by the user. For example, visual information displayed in the HMD device 210 may be provided to the user through the HMD device worn by the user. At this time, the user who wears the HMD device 210 may view the visual information only displayed in the HMD device 210 by blocking external exposure. As a result, the HMD device 210 may provide the user with stereoscopic image or augmented reality image. Also, the HMD device 210 may be used for console games or 3D car game.

For another example, the user may enjoy visual information by wearing the eye-glasses type or helmet type HMD device 210 and blocking external exposure. If the user moves in a state that the user wears the HMD device 210, a problem occurs in that the user cannot secure a clear view. Also, the user who wears eye-glasses may wear the HMD device 210 by taking off the eye-glasses. However, the HMD device 210 may be manufactured in accordance with a certain standard without being manufactured by reflecting eye-glasses features or eyesight information of the user. At this time, if eye-glasses features of the user and eyesight information of the user are different from those of the HMD device 210, a problem may occur in that the user cannot view visual information clearly even though the user wears the HMD device 210.

Figure 3:
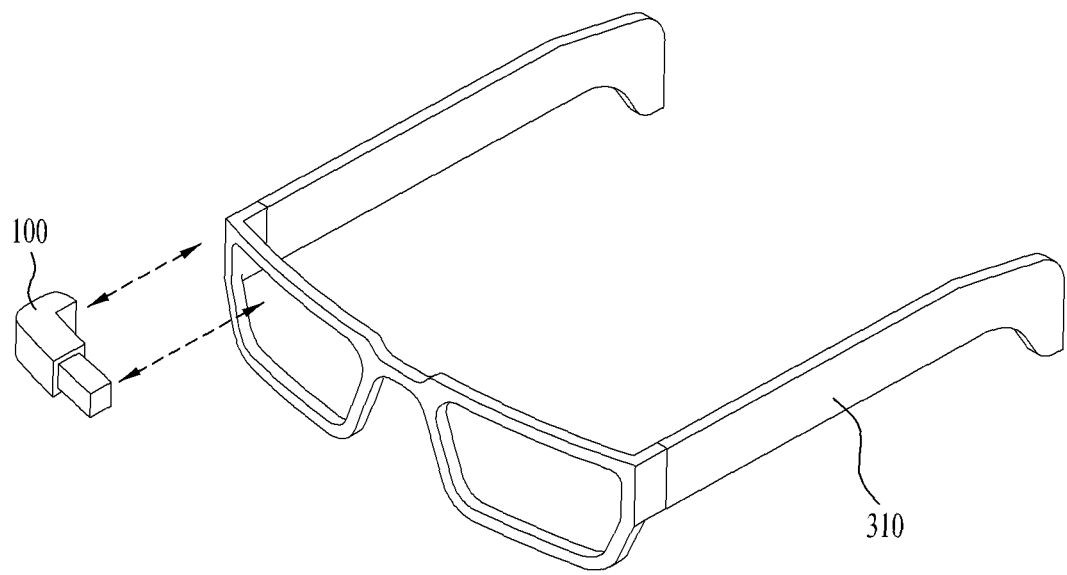
FIG. 3 is a diagram illustrating a detachable HMD device according to one embodiment of the present specification.

FIG. 3 is a diagram illustrating a detachable HMD device 100 according to one embodiment of the present specification. Referring to FIG. 3, the HMD device 100 may detachably be affixed to the eye-glasses. In more detail, the HMD device 100 may be manufactured in a micro shape and then affixed to eye-glasses 310 worn by a user. At this time, the HMD device 100 may be manufactured in a micro shape to be affixed to the eye-glasses 310. In more detail, the HMD device 100 may be manufactured at a small size to be affixed to a part of the eye-glasses 310 of the user. The HMD device 100 is worn at a lens or temple part of the eye-glasses 310 to display visual information at a portion where the user's view is located. Also, the HMD device may be affixed to, but not limited to, another part of the eye-glasses 310 to provide the user with visual information.

At this time, the HMD device 100 may detect various control inputs of the user in accordance with the position of the eye-glasses 310. If the user forwards the control input to the HMD device 100, since the HMD device 100 is manufacture in a micro shape and affixed to the eye-glasses 310, the control input provided to the HMD device 100 may be limited. Accordingly, the HMD device 100 may provide different control inputs depending on the position where the HMD device 100 is affixed to the eye-glasses 310, thereby detecting various control inputs of the user. Also, as an example, the HMD device 100 may provide various user interfaces in accordance with the position of the eye-glasses 310. As a result, various interfaces based on the affixed position of the HMD device 100 may be provide to the user. For example, the HMD device 100 may affixed to a left lens part of the eye-glasses 310 or a right lens part of the eye-glasses 310. If the HMD device 100 is affixed to the right lens part of the eye-glasses 310, the HMD device 100 may provide an interface that plays video viewed by the user. Also, if the HMD device 100 is affixed to the left lens part of the eye-glasses 310, the HMD device 100 may provide an interface that plays music listened by the user. In addition, the HMD device 100 may be affixed to the other parts of the eye-glasses 310 without limitation to the aforementioned examples.

Also, the HMD device 100 may be manufactured at various sizes. In more detail, the HMD device 100 may be manufactured at various sizes considering a size and a length of the eye-glasses 310 to which the HMD device 100 is affixed. At this time, the HMD device 100 may be manufactured by standardizing the size and the length of the eye-glasses 310 to which the HMD device 100 is affixed.

Also, the eye-glasses 310 to which the HMD device 100 is affixed may be coated with a conductive material. At this time, the conductive material may be, but not limited to, a material, such as Al, Au, or carbon nanotube, which is coated in the eye-glasses 310 to flow a current in the eye-glasses 310. At this time, the current is a micro current that may detect the input signal corresponding to the input of the user.

For example, the conductive material may be coated in the entire frame of the eye-glasses 310. Also, the conductive material may be coated in a part of the frame of the eye-glasses 310. The HMD device 100 may control an area where the input signal which is touched is detected.

The HMD device 100 may be manufactured in a micro shape. Accordingly, the HMD device 100 may enlarge the area where the control input of the user is detected, towards the eye-glasses 310 to which the HMD device 100 is affixed. At this time, the HMD device 100 may apply a current, which detects an input signal generated when the eye-glasses 310 to which the HMD device 100 is affixed are touched, to the eye-glasses 310. Also, the HMD device 100 may receive the current applied to the eye-glasses 310. As a result, the HMD device 100 may receive the current varied by the touch input and detect the input signal. In other words, the HMD device 100 may be affixed to the eye-glasses 310 and use the input signal generated when the eye-glasses 310 are touched.

Figure 4:
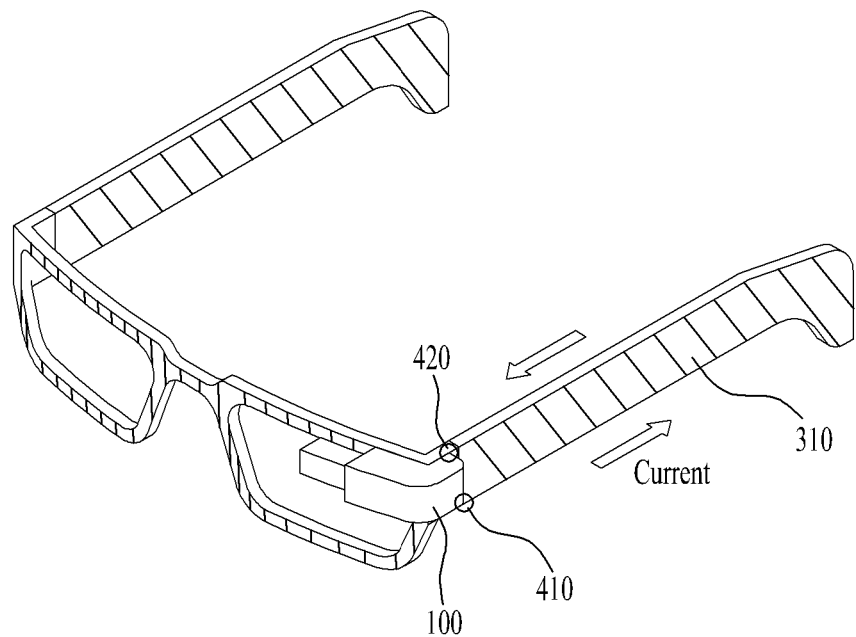
FIG. 4 is a diagram illustrating a method for enabling an HMD device to detect an input signal generated when eye-glasses are touched in accordance with one embodiment of the present specification.
Figure 4:
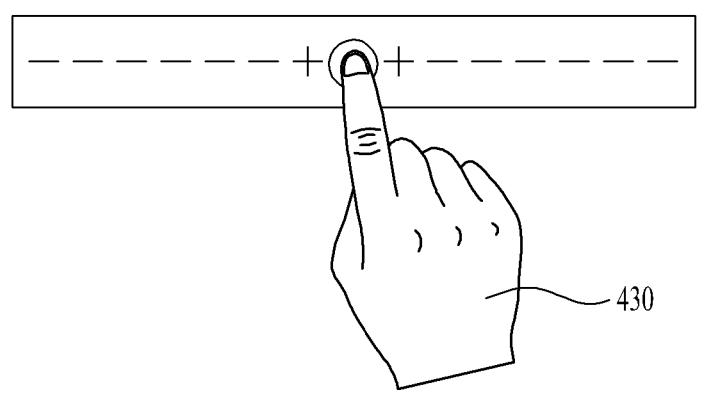

FIG. 4 is a diagram illustrating a method for enabling an HMD device 100 to detect an input signal generated when eye-glasses 310 are touched in accordance with one embodiment of the present specification. The HMD device 100 may be affixed to the eye-glasses 310. The HMD device 100 may detect that the HMD device 100 is affixed to the eye-glasses 310, by using the detached sensor unit 120. At this time, as described above, the HMD device 100 may output an electromagnetic pattern to the portion of the eye-glasses to which the HMD device 100 is affixed, and may detect that the HMD device 100 is affixed to the eye-glasses 310 by detecting the electromagnetic pattern varied by the eye-glasses 310 coated with a conductive material. Also, the HMD device 100 may detect that the HMD device 100 is affixed to the eye-glasses 310, through an RFID signal, a bar code, or a QR code. The HMD device is not limited to the aforementioned embodiment.

If the HMD device 100 detects that the HMD device 100 is affixed to the eye-glasses 310, the HMD device 100 may apply a current to the eye-glasses 310 and receive the applied current. In more detail, the HMD device 100 may apply a current to the eye-glasses 310 through a first contact point 410 and receive the current applied to the eye-glasses 310, through a second contact point 420. If the current is applied from the HMD device 100 to the eye-glasses 310, the current may flow to the frame of the eye-glasses 310. In other words, the HMD device 100 may apply the current to the eye-glasses 310 through the first contact point 410, and may receive the applied current by the second contact point 420 along the frame of the eye-glasses 310. At this time, as an example, the HMD device 100 may regard the first contact point 410 and the second contact point 420 as one contact point. The HMD device 100 may generate one contact point at the position where the HMD device 100 is affixed to the eye-glasses 310, and may apply the current to one contact point and receive the current. In other words, the HMD device 100 may be affixed to the eye-glasses 310 and sense variation of the current at the eye-glasses 310 through the contact point where the current is applied and received, and is not limited to the aforementioned embodiment. Also, for example, the current may flow to the area only of the frame of the eye-glasses 310, which is coated with the conductive material.

If the HMD device 100 detects that the HMD device 100 is affixed to the eye-glasses 310, and applies the current to the eye-glasses 310, the HMD device 100 may detect the input signal generated when the eye-glasses to which the HMD device 100 is affixed are touched by using the sensor unit 130. In more detail, the current may flow to the eye-glasses 310 through the HMD device 100. At this time, the user 430 may touch the eye-glasses to which the HMD device 100 is affixed. If the user 430 touches the eye-glasses 310, the HMD device 100 may detect a point of the frame of the eye-glasses 310, wherein the point is touched by the user 430. At this time, the current of the point which is touched may be varied by the touch input of the user 430. The HMD device 100 may detect the input signal generated when the user 430 touches the eye-glasses 310 by detecting the point where the current is varied. Also, for example, the HMD device 100 may detect the input signal, which is touched twice by the user 430 or touched by a slide. For another example, the HMD device 100 may detect the input signal generated when the user touches a plurality of points of the eye-glasses 310. The HMD device 100 may detect the input signal without limitation to the aforementioned embodiment.

Figure 5:
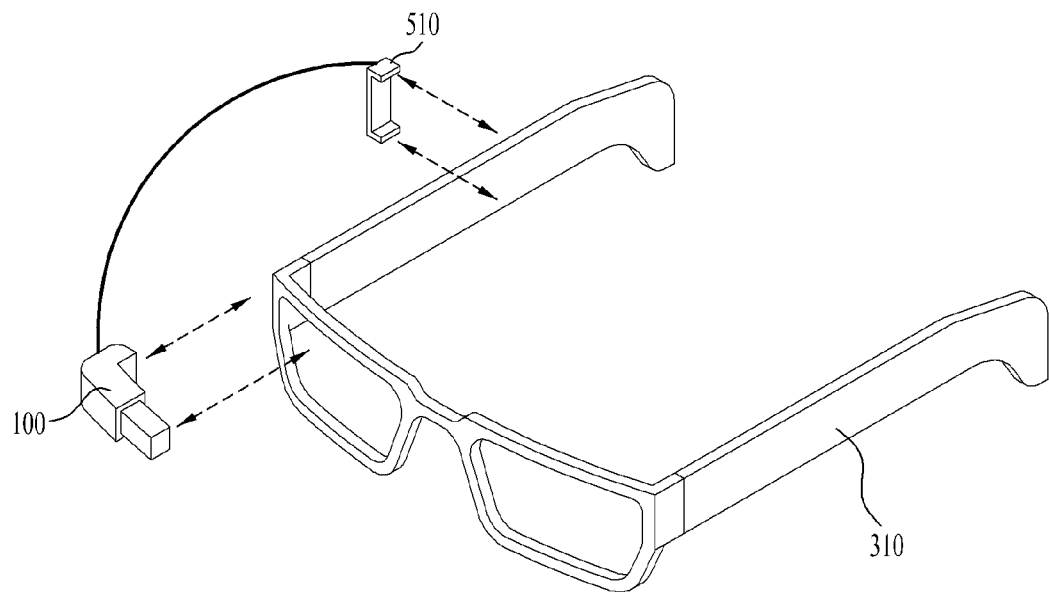
FIG. 5 is a diagram illustrating a method for enabling an HMD device 100 to further include a current reception unit in accordance with one embodiment of the present specification.
Figure 5:
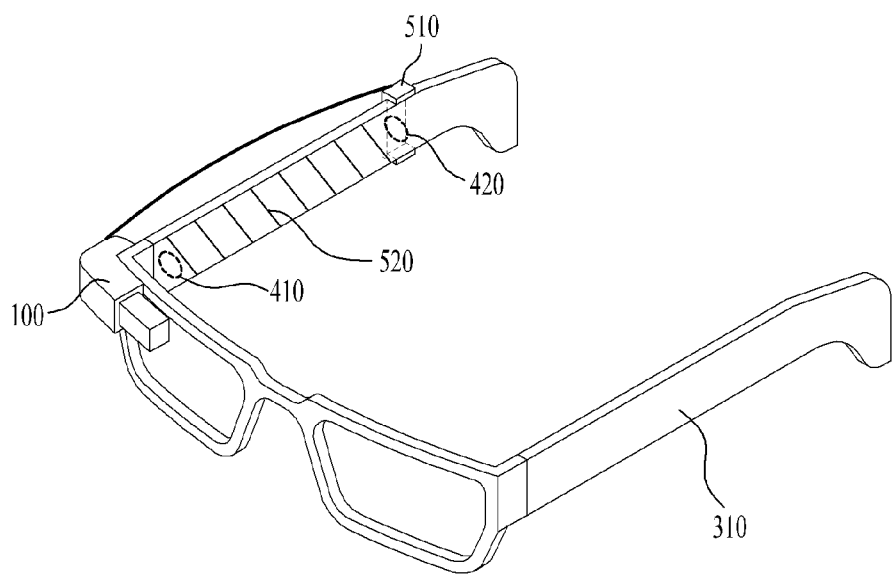

FIG. 5 is a diagram illustrating a method for enabling an HMD device 100 to further include a current reception unit 510 in accordance with one embodiment of the present specification.

Referring to FIG. 5, the HMD device 100 may further include a current reception unit 510. The current reception unit 510 may be a separate unit connected with the HMD device 100 through a wire. Also, the current reception unit 510 may receive the current applied to the eye-glasses 310 by the HMD device 100. In other words, the current reception unit 510 may include a second contact point 420 where the current applied to the eye-glasses 310 by the HMD device 100.

In more detail, the current reception unit 510 may be affixed to another part of the eye-glasses 310 to which the HMD device 100 is affixed. For example, the HMD device 100 may be affixed to a lens part of the eye-glasses 310, that is, the position where the user's view reaches. The current reception unit 510 may be affixed to a temple part of the eye-glasses 310 to which the HMD device 100 is affixed, wherein the temple part is connected with the lens of the eye-glasses 310. If the current reception unit 510 is affixed to the eye-glasses 310, the first contact point 410 that applies the current may be located at the position where the HMD device 100 is affixed, and the second contact point 420 that receives the current applied to the eye-glasses 310 may be located at the current reception unit 510. In more detail, the HMD device 100 may apply the current to the eye-glasses 310 through the first contact point 410, and the current reception unit 100 may receive the current applied to the eye-glasses 310 through the second contact point 420. At this time, the current may only flow between the first contact point 410 where the current is applied and the second contact point 420 that receives the current. In other words, the HMD device 100 may only flow the current to the position where the HMD device 100 is affixed and the position where the current reception unit 510 is affixed, and may detect the touch input of the user only at the area where the current flows. At this time, the HMD device 100 may be located at the area of the eye-glasses 310, which is coated with the conductive material. In other words, the first contact point 410 and the second contact point 420 may be located at the area of the eye-glasses 310, which is coated with the conductive material.

The HMD device 100 may set the area between the HMD device 100 and the current reception unit 510 as the input signal sensing area 520. The input signal sensing area 520 may mean the area of the eye-glasses 310, where the current flows by means of the HMD device. At this time, the HMD device 100 may detect the touch input only of the user, which corresponds to the input signal sensing area 520. As a result, the user may set the area of the eye-glasses 310, where an input for controlling the HMD device 100 is input. In other words, if the HMD device 100 is affixed to the eye-glasses, the user may control the HMD device 100 by touching the input signal sensing area 520.

At this time, the HMD device 100 may control the length of the input signal sensing area 520 on the basis of the position where the current reception unit 510 is affixed. Also, as an example, if the HMD device 100 is affixed to the right lens of the eye-glasses 310 and the current reception unit 510 is affixed to the right temple, the input signal sensing area 520 may be formed at the right temple of the eye-glasses 310. Also, if the HMD device 100 is affixed to the left lens and the current reception unit 510 is affixed to the left temple, the input signal sensing area 520 may be formed at the left temple of the eye-glasses 310. At this time, the HMD device 100 may control the user interface, which is displayed, on the basis of the length or the position of the input signal sensing area 520. In more detail, if the HMD device 100 detects that the current reception unit 510 is affixed, the HMD device 100 may detect the positions of the first contact point 410 and the second contact point 420. If the HMD device 100 detects the positions of the first contact point 410 and the second contact point 420, the HMD device 100 may detect the length and the position of the input signal sensing area 520. At this time, the HMD device 100 may display another user interface on the basis of at least one of the length and the position of the input signal sensing area 520.

For example, the HMD device 100 may display the user interface on the basis of the length of the input signal sensing area 520. In more detail, if the length of the input signal sensing area 520 is more than a threshold length, the HMD device 100 may display the user interface that plays video. Also, if the length of the input signal sensing area 520 is less than the threshold length, the HMD device 100 may display the user interface that plays music.

Also, the HMD device 100 may display the user interface on the basis of the position of the input signal sensing area 520.

For example, if the input signal sensing area 520 is located at the left temple of the eye-glasses 310, the HMD device 100 may display the user interface that plays stereoscopic image.

Also, for example, if the input signal sensing area 520 is located at the right temple of the eye-glasses 310, the HMD device 100 may display the user interface that displays augmented reality.

Also, the HMD device 100 may provide the user interface by considering the position and the length of the input signal sensing area 520. Also, the user interface may be set by the user or the HMD device 100, and is not limited to the aforementioned embodiment.

Also, the HMD device 100 may control the look up table on the basis of the length or the position of the input signal sensing area 520. This will be described later with reference to FIGS. 7a to 7c and FIGS. 8a and 8b.

Figure 6A:
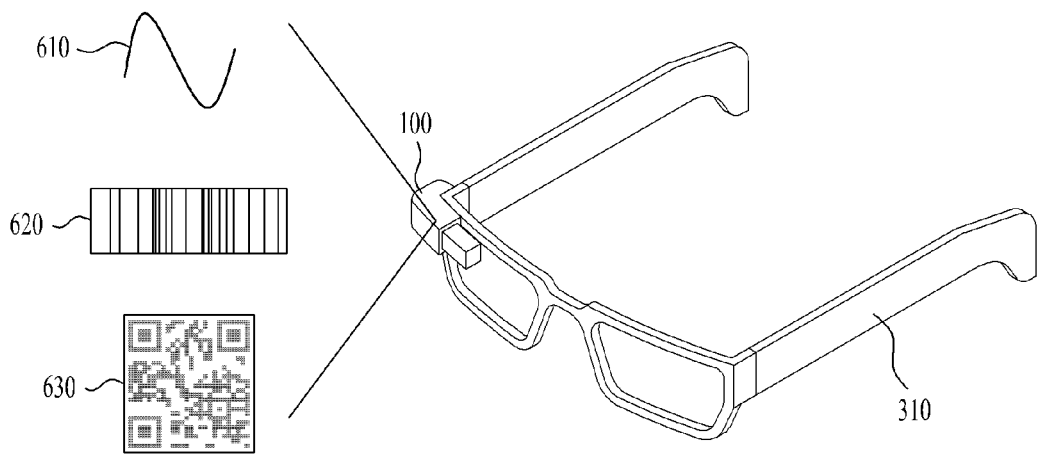
FIGS. 6a and 6b are diagrams illustrating a method for enabling an HMD device to acquire identification information and acquire a look up table in accordance with one embodiment of the present specification.
Figure 6B:
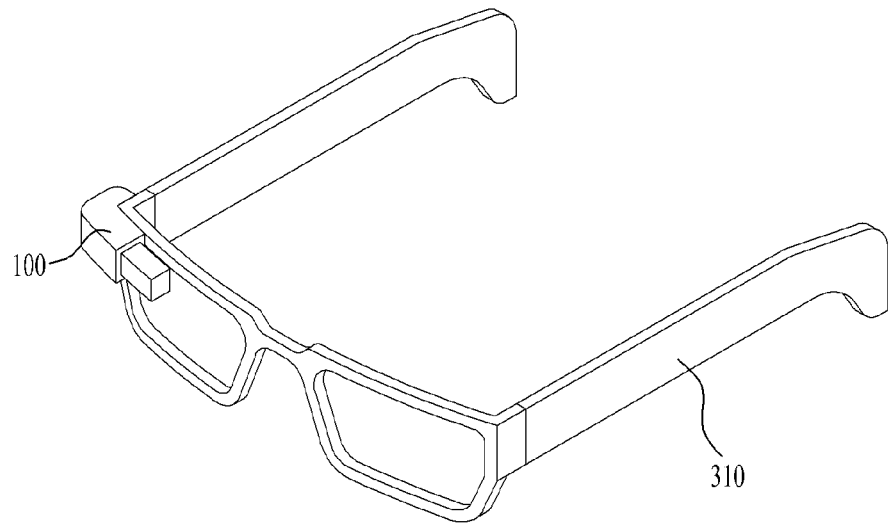
Figure 6B:
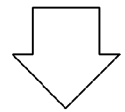
Figure 6B:
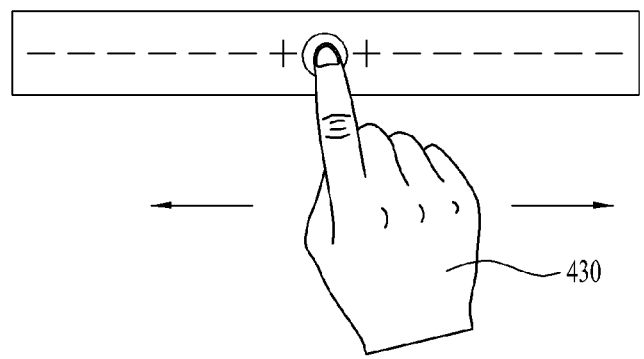

FIGS. 6a and 6b are diagrams illustrating a method for enabling an HMD device 100 to acquire identification information and acquire a look up table in accordance with one embodiment of the present specification.

If the HMD device 100 detects that the HMD device 100 is affixed to the eye-glasses 310, the HMD device 100 may acquire identification information 640 of the eye-glasses 310 to which the HMD device 100 is affixed. At this time, the identification information 640 may mean information identified per eye-glasses 310 to which the HMD device 100 is affixed. In more detail, the identification information may include at least one of a type of the eye-glasses, appearance of the eye-glasses, parts of the eye-glasses, a material coated in the eye-glasses, conductivity of the eye-glasses, a length of an area of the eye-glasses coated with a conductive material, a lens size of the eye-glasses, and a thickness of the eye-glasses. In addition, the identification information may include information on the eye-glasses to which the HMD device 100 is affixed, and is not limited to the aforementioned examples.

If the HMD device 100 detects that the HMD device 100 is affixed to the eye-glasses 310, the HMD device 100 may acquire the identification information 640 by using at least one of variation of electric signal, RFID signal, bar code, and QR code. Also, the HMD device 100 may acquire the identification information through a value predetermined between the eye-glasses 310 and the HMD device 100. The HMD device 100 may acquire the identification information without limitation to the aforementioned embodiment.

If the HMD device 100 acquires the identification information 640, the HMD device 100 may acquire a look up table 650 related to the identification information 640. If the HMD device 100 acquires the look up table 650, the HMD device 100 may receive the input signal, which is generated when the eye-glasses 310 to which the HMD device 100 is affixed are touched, from the sensor unit 130.

At this time, the look up table 650 may be a set of predetermined values corresponding to a given input signal. In more detail, the look up table 650 may be a value corresponding to a control input matched with the input signal which is generated when the user 430 touches the eye-glasses 310. Also, the look up table 650 may be set on the basis of the acquired identification information 640. For example, the look up table 650 may be set differently depending on the conductive material coated in the eye-glasses 310 and the length of the eye-glasses coated with the conductive material among the identification information 640.

The HMD device 100 may acquire the control input related to the input signal from the look up table 650. At this time, the control input may be a control input for an interface performed by the HMD device 100. For example, if the input signal generated when the user touches the eye-glasses 310 one time is detected, the HMD device 100 may acquire the control input, which performs one-click, from the look up table 650. Also, if the input signal generated when the user touches the eye-glasses 310 through a slide is detected, the HMD device 100 may acquire the control input, which performs a slide, from the look up table 650. Also, if the user touches two points at the same time, the HMD device 100 may acquire a control input corresponding to multi-touch from the look up table 650. At this time, the look up table 650 may be set to include the control input corresponding to the aforementioned embodiments. Also, the look up table 650 may be varied by the user or the HMD device 100 without limitation to the aforementioned embodiment.

Also, if the HMD device 100 acquires the control input, the HMD device 100 may perform a function corresponding to the control input. At this time, the function may be a command that controls the user interface performed by the HMD device 100. For example, if the HMD device 100 performs the user interface that plays music and acquires the control input, which performs one-click, from the look up table 650, the HMD device 100 may perform a function that stops the music which is being played, or replays the music. For another example, if the HMD device 100 displays a menu and acquires the control input, which performs one-click, from the look up table 650, the HMD device 100 may perform a function that selects an icon in a menu.

In other words, the HMD device 100 may control the function performed by the control input by considering the user interface which is performed.

In accordance with the present specification, FIG. 6a is a diagram illustrating a method for enabling an HMD device 100 to acquire identification information 640. If the HMD device 100 detects that the HMD device 100 is affixed to the eye-glasses 310, the HMD device 100 may acquire the identification information 640. At this time, the HMD device 100 may detect RFID signal 610 of the eye-glasses 310 to which the HMD device 100 is affixed. In more detail, the eye-glasses 310 may include RFID tag in which the identification information on the eye-glasses is written. At this time, the HMD device 100 may further include an RFID reader. The HMD device 100 may acquire the identification information 640 on the eye-glasses 310 by using the RFID reader.

Also, as an example, the HMD device 100 may detect a bar code 620 of the eye-glasses 310 to which the HMD device 100 is affixed. In more detail, the eye-glasses 310 may include a bar code in which the identification information 640 on the eye-glasses is written. At this time, the HMD device 100 may further include a bar code reader. The HMD device 100 may detect the bar code 620 included in the eye-glasses 310 by using the bar code reader, and may acquire the identification information 640 on the eye-glasses 310 to which the HMD device 100 is affixed.

Also, as an example, the HMD device 100 may detect QR code 630 of the eye-glasses 310 to which the HMD device 100 is affixed. In more detail, the eye-glasses 310 may include QR code in which the identification information 640 on the eye-glasses is written. At this time, the HMD device 100 may further include a camera unit (not shown). The HMD device 100 may detect QR code 630 by using the camera unit and acquire the identification information 640 on the eye-glasses 310 to which the HMD device is affixed.

In addition, the HMD device 100 may generate an electric signal and detect the eye-glasses 310 through variation of the electric signal. The HMD device may detect the eye-glasses without limitation to the aforementioned embodiments.

If the HMD device 100 acquires the identification information 640, the HMD device 100 may acquire the look up table 650 on the basis of the identification information 310. If the HMD device 100 acquires the look up table 650, the HMD device 100 may determine the look up table by reflecting information included in the identification information 640. For example, the HMD device 100 may acquire identification information 640 on first eye-glasses. The first eye-glasses may be coated with aluminum, wherein the entire frame of the eye-glasses 310 may be coated with a conductive material. Also, the HMD device 100 may acquire identification information 640 on second eye-glasses. The second eye-glasses may be coated with carbon nanotube, wherein a right temple area of the eye-glasses 310 may only be coated with a conductive material. At this time, the HMD device 100 may set the look up table 650 differently for each of the case where the first eye-glasses are identified and the case where the second eye-glasses are identified. In more detail, the look up table 650 may be a table, which corresponds to the input signal generated when the eye-glasses 310, to which the HMD device is affixed are touched, and a control input corresponding to the input signal. At this time, the input signal generated when the first eye-glasses fully coated with aluminum are touched may not be the same as the input signal generated when the second eye-glasses of which right temple area is coated with carbon nanotube are touched. Accordingly, the look up table 650 may be set differently per eye-glasses on the basis of the identification information 640. Also, the identification information 640 is not limited to the aforementioned embodiment, and may be information representing features of the eye-glasses 310.

FIG. 6b is a diagram illustrating a method for enabling an HMD device 100 to acquire a control input corresponding to an input signal from a look up table 650 which is acquired. The HMD device 100 may receive the input signal, which is generated when the eye-glasses 310 to which the HMD device 100 is affixed, from the sensor unit 130. At this time, the HMD device 100 may detect a matched input signal from the acquired look up table 650. In more detail, the HMD device 100 may detect the input signal generated when the user 430 touches the eye-glasses 310 to which the HMD device 100 is affixed. At this time, the input signal may be a signal that senses electric variation generated when the user 430 touches the eye-glasses 310 having conductivity. If the HMD device 100 detects the input signal, the HMD device 100 may acquire an input signal from the look up table 650, which is matched with the above input signal. For example, the HMD device 100 may acquire a control input that performs one-click for the input signal generated when the user 430 touches the eye-glasses 310 one time. Also, the HMD device 100 may acquire a control input that performs double-click for the input signal generated when the user 430 touches the eye-glasses 310 continuously twice. Also, for example, the HMD device 100 may acquire the input signal generated when the user 430 slide-touches the eye-glasses 310 as a slide input signal. For another example, the HMD device 100 may acquire a control input that performs multi-touch for the input signal generated when the user 430 touches a plurality of points of the eye-glasses 310. In other words, the user 430 may forward a control input to the detachable HMD device 100 by touching the eye-glasses 310 to which the HMD device 100 is affixed.

Also, the HMD device 100 may include a plurality of look up tables 650. In more detail, the HMD device 100 may include a plurality of look up tables 650 for the same identification information. At this time, the HMD device 100 may determine the look up table 650 through input of the user. In other words, the user may manually set the look up table 650 for the same identification information. As a result, the user may use the look up table 650 set considering features of the user. In more detail, the user may manually set the control input matched with the input signal at the look up table 650. Also, the HMD device 100 may update a predetermined look up table in accordance with the input of the user. Also, as described above, the HMD device 100 may set the function matched with the control input differently in accordance with the user interface which is performed. At this time, the HMD device 100 may set the function matched with the control input differently in accordance with the input of the user.

In other words, the user may manually set the control input corresponding to the input signal and the function corresponding to the control input at the look up table. As a result, the user may forward various control inputs to the HMD device 100 that acquires a limited control input.

Also, the HMD device 100 may further detect feature information of the eye-glasses 310 to which the HMD device 100 is affixed, by using the sensor unit 130. At this time, the feature information may include at least one of a type of the eye-glasses, appearance of the eye-glasses, parts of the eye-glasses, a material coated in the eye-glasses, conductivity of the eye-glasses, a length of an area of the eye-glasses coated with a conductive material, a lens size of the eye-glasses, and a thickness of the eye-glasses. In addition, the feature information may include information on the eye-glasses to which the HMD device 100 is affixed. In other words, the feature information may be the same as the aforementioned identification information 640. However, the HMD device 100 may detect the feature information by using the sensor unit 130. In more detail, the identification information may be acquired using predetermined ID information such as RFID signal, bar code, and QR code. However, the feature information may directly be detected by the HMD device 100 from the eye-glasses 310 by using the sensor unit 130.

The HMD device 100 may receive the feature information acquired by the sensor unit 130 and determine whether the feature information is matched with the identification information 640. At this time, if the feature information is matched with the identification information 640, the HMD device 100 may acquire and maintain the look up table on the basis of the existing identification information. However, if the feature information is not matched with the identification information 640, the HMD device 100 may update the look up table on the basis of the identification information 640 forwarded from the sensor unit 130. In more detail, the eye-glasses 310 to which the HMD device 100 is affixed may have a conductive material worn out in accordance with the passage of time, or may have feature information different from the identification information as the user replaces parts with another ones. At this time, if the HMD device 100 sets the look up table 650 on the basis of the identification information 640, the input signal acquired by the HMD device 100 may not be matched with that of the look up table. Accordingly, the HMD device 100 may further detect feature information of the eye-glasses 310 to which the HMD device 100 is affixed, by using the sensor unit 130. As a result, the HMD device 100 may identify varied information of the eye-glasses 310 to which the HMD device 100 is affixed, and may update the look up table 650 in accordance with the varied information. Also, for example, the HMD device 100 may update the identification information 640 on the basis of the feature information.

Also, for another example, if the HMD device 100 compares the feature information with the identification information 640, the HMD device 100 may recognize the varied feature information as the same identification information if the varied feature information is within the range of a constant error. At this time, the HMD device 100 may acquire the look up table on the basis of the identification information 640.

In other words, the HMD device 100 may acquire the look up table 650 on the basis of the identification information 640, and may control the look up table 650 by identifying the feature information. As a result, the HMD device 100 may improve a recognition rate for the control input of the user.

Figure 7A:
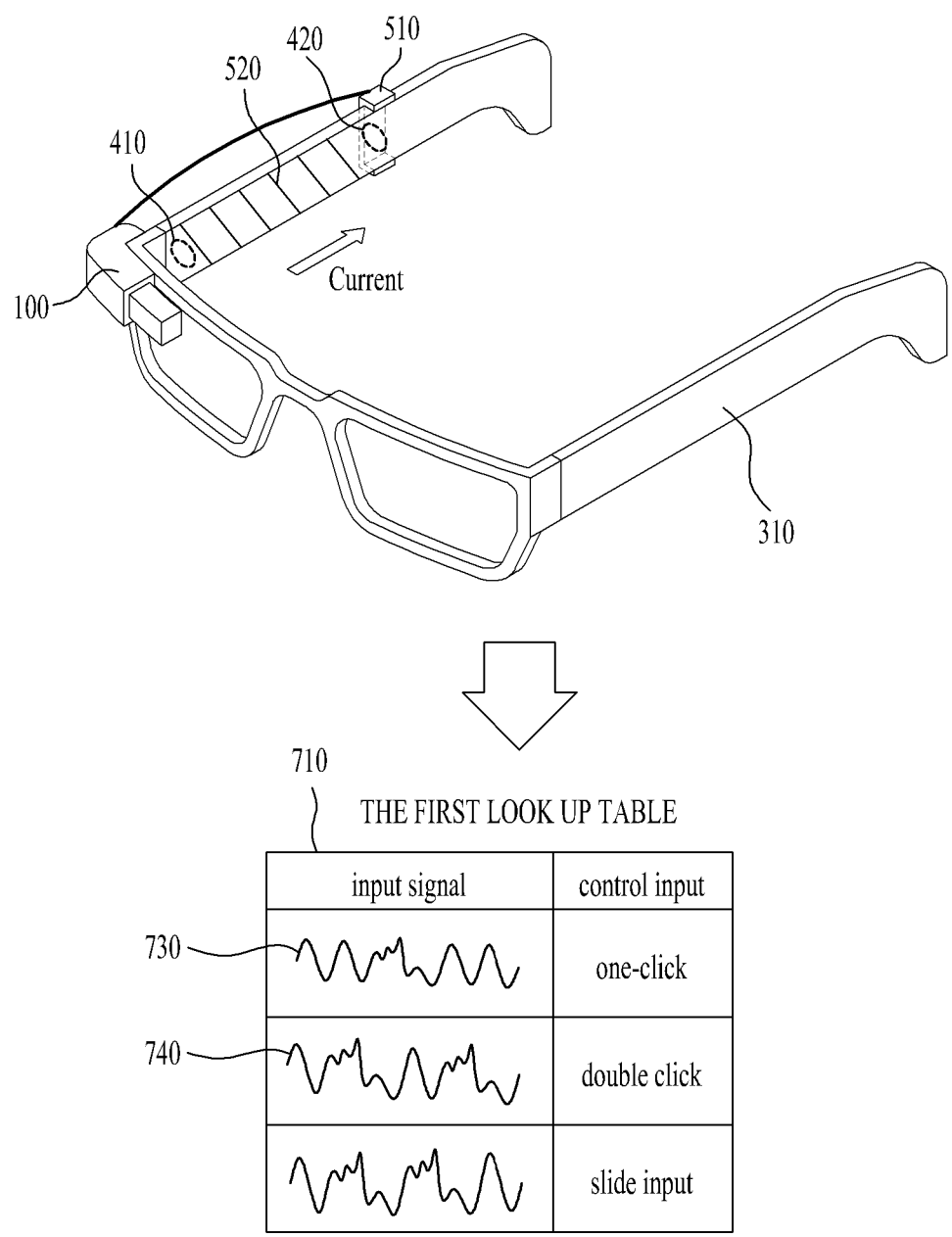
FIGS. 7a to 7c are diagrams illustrating a method for enabling an HMD device to acquire a look up table on the basis of a length of an input signal sensing area in accordance with one embodiment of the present specification.
Figure 7B:
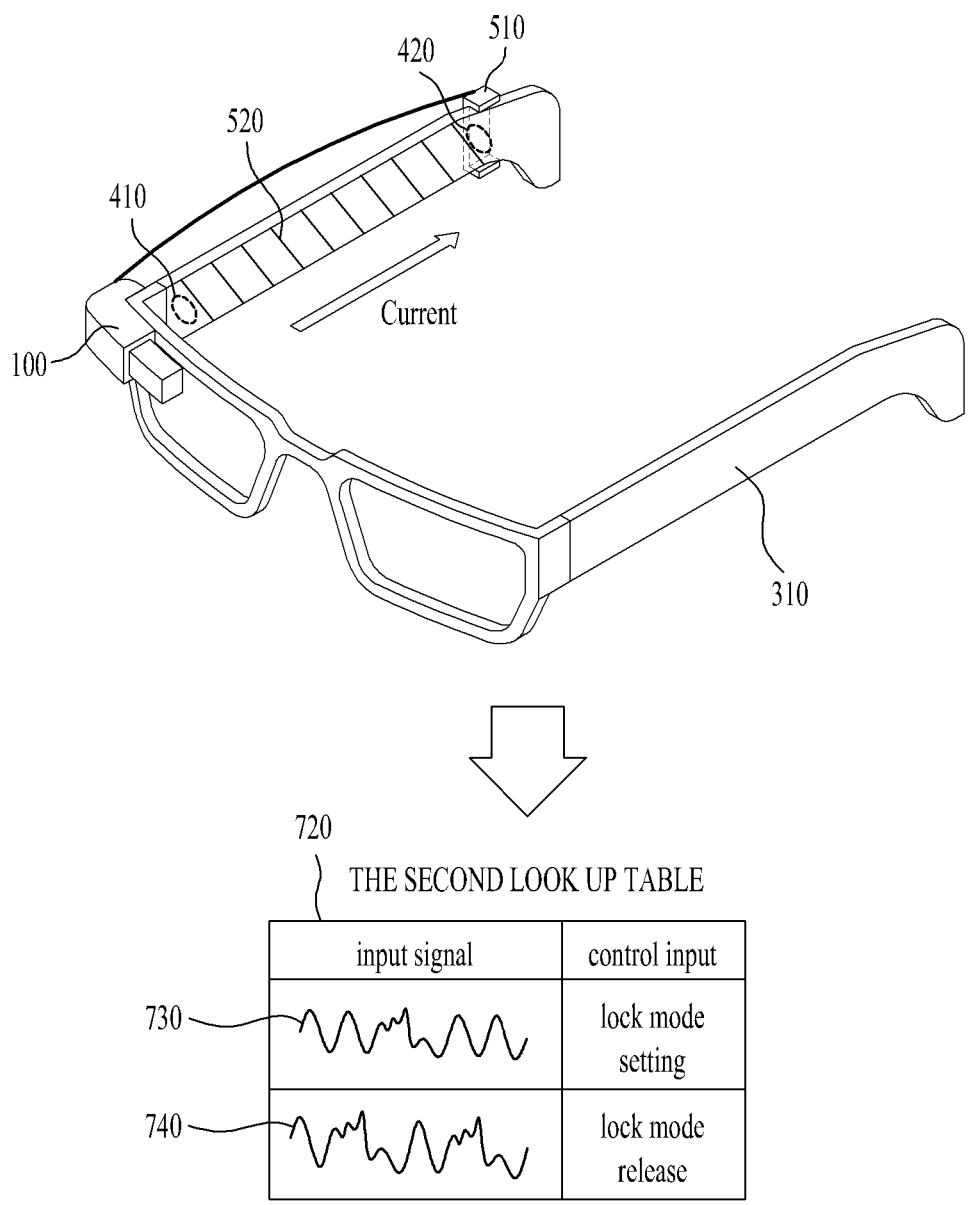
Figure 7C:
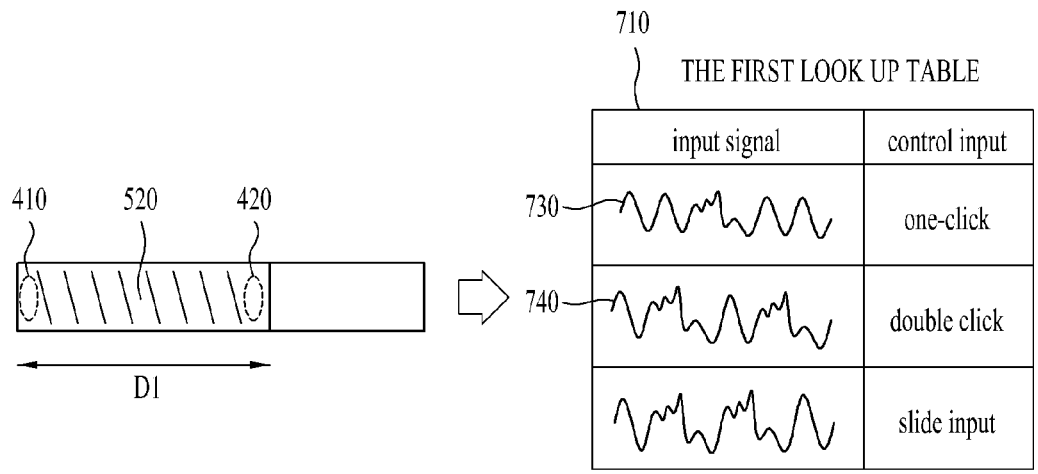
Figure 7C:
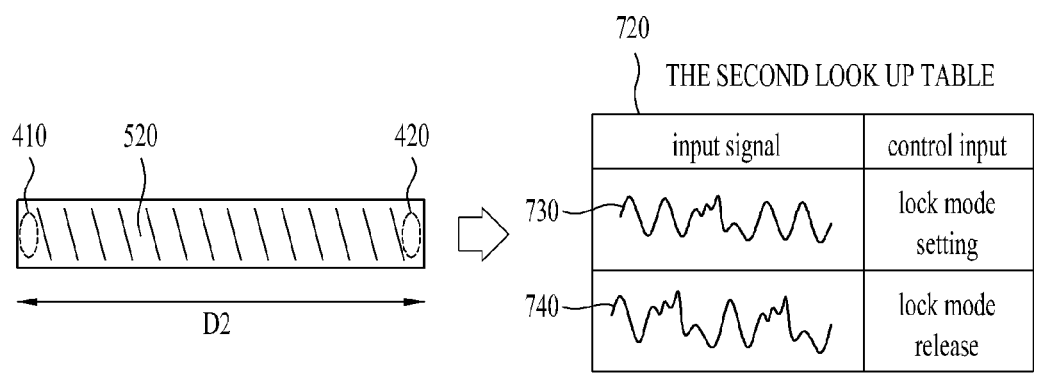

FIGS. 7a to 7c are diagrams illustrating a method for enabling an HMD device 100 to acquire a look up table on the basis of a length of an input signal sensing area in accordance with one embodiment of the present specification.

The HMD device 100 may set the look up table on the basis of a length of an input signal sensing area 520. At this time, as described above, the input signal sensing area 520 may be an area between the first contact point 410 and the second contact point 420. In other words, the input signal sensing area 520 may be an area where a current flows in the eye-glasses 310 to which the HMD device 100 is affixed. In the words, the input signal sensing area 520 may be an area where the input signal touched by the user may be detected.

The HMD device 100 may control the length of the input signal sensing area 520 by controlling the positions of the first contact point 410 and the second contact point 420. In more detail, the HMD device 100 may control the length of the input signal sensing area 520 on the basis of the position where the current reception unit 510 is affixed to the eye-glasses 310. At this time, the current reception unit 510 may be affixed to another portion of the eye-glasses 310 to which the HMD device 100 is affixed. If the current reception unit 510 is affixed to the eye-glasses 310, the current reception unit 510 may generate the second contact point 420 at the position where the current reception unit is affixed to the eye-glasses 310. At this time, if the HMD device 100 applies a current to the eye-glasses 310 through the first contact point 410, the current reception unit 510 may receive the current by using the second contact point 420. The HMD device 100 may detect current variation at the input signal sensing area 520 where the current flows, by using the sensor unit 130. In more detail, the HMD device 100 may detect the input signal on the basis of the current variation generated when the user touches the input signal sensing area 520.

If the HMD device 100 determines the look up table on the basis of the length of the input signal sensing area 520, the HMD device 100 may determine whether the length of the input signal sensing area 520 is more than a threshold length. At this time, if the length of the input signal sensing area 520 is less than the threshold length, the HMD device 100 may acquire a control input on the basis of a first look up table 710. Also, if the length of the input signal sensing area 520 is more than the threshold length, the HMD device 100 may acquire a control input on the basis of a second look up table 720. At this time, the first look up table 710 and the second look up table 720 may have their respective control inputs different from each other for the same input signal. In more detail, if the HMD device 100 performs the same interface, the HMD device 100 may allow the first look up table 710 and the second look up table 720 to have different control inputs for the same input signal. For example, if the HMD device 100 displays an interface for menu selection, a first input signal 730 of the first look up table 710 may be a control input for one-click, which selects a menu. On the other hand, if the HMD device 100 displays an interface for menu selection, a first input signal 730 of the second look up table 720 may be a control input that selects a lock mode so as not to select a menu. In other words, the HMD device 100 may set the look up table differently depending on the length of the input signal sensing area 520, and may acquire different control inputs for the same input signal.

Also, as an example, the look up table may be set by the user. Also, the look up table may be updated by the user or through an external server.

Also, as an example, the HMD device 100 may perform an interface varied depending on the length of the input signal sensing area 520. In more detail, if the input signal sensing area 520 is less than the threshold length, the HMD device 100 may display the interface for menu selection. Also, if the input signal sensing area 520 is more than the threshold length, the HMD device 100 may display an interface that selects a gallery image. In other words, the interface of the HMD device 100 may be set differently depending on the length of the input signal sensing area 520, and is not limited to the aforementioned embodiment.

Also, as an example, the HMD device 100 may have a plurality of threshold lengths. At this time, the HMD device 100 may acquire a respective look up table for each period of the threshold length. Also, as an example, the HMD device 100 may perform a respective interface for each period of the threshold length.

Referring to FIG. 7a, if the length of the input signal sensing area 520 is less than the threshold length, the HMD device 100 may acquire the first look up table 710. At this time, the length of the input signal sensing area 520 may be determined in accordance with the position where the current reception unit 510 is affixed to the eye-glasses 310. Also, as an example, the HMD device 100 may set the first look up table 710 when the input signal sensing area 520 is located at the right temple differently from the first look up table 710 when the input signal sensing area 520 is located at the left temple.

For example, if the HMD device 100 acquires the control input on the basis of the first look up table 710, the first input signal 730 may be a control input of one-click. At this time, the first input signal 730 may be the input signal generated when the user touches the input signal sensing area 520 one time. Also, if the HMD device 100 acquires the control input on the basis of the first look up table 710, the second input signal 740 may be a control input of double-click. At this time, the second input signal 740 may be the input signal generated when the user touches the same position of the input signal sensing area 520 twice. Also, the first look up table 710 may include a control input corresponding to an input signal of multi-touch, and is not limited to the aforementioned example.

In accordance with one embodiment, referring to FIG. 7b, if the length of the input signal sensing area 520 is more than the threshold length, the HMD device 100 may acquire the second look up table 720. At this time, the length of the input signal sensing area 520 may be determined in accordance with the position where the current reception unit 510 is affixed to the eye-glasses 310. Also, as an example, the HMD device 100 may set the second look up table 720 when the input signal sensing area 520 is located at the right temple differently from the second look up table 720 when the input signal sensing area 520 is located at the left temple.

Also, as one example, if the HMD device 100 acquires the control input on the basis of the second look up table 720, the first input signal 730 may be a control input that sets a lock mode. At this time, the first input signal 730 may be the input signal generated when the user touches the input signal sensing area 520 one time. Also, if the HMD device 100 acquires the control input on the basis of the second look up table 720, the second input signal 740 may be a control input that unlocks the lock mode. At this time, the second input signal 740 may be the input signal generated when the user touches the same position of the input signal sensing area 520 twice. Also, the second look up table 720 may include a control input corresponding to an input signal of multi-touch, and is not limited to the aforementioned example.

In accordance with one embodiment, referring to FIG. 7c, the HMD device 100 may acquire a look up table varied depending on the length of the input signal sensing area 520. At this time, if the length of the input signal sensing area 520 is less the threshold length, the HMD device 100 may acquire the first look up table 710. Also, if the length of the input signal sensing area 520 is more than the threshold length, the HMD device 100 may acquire the second look up table 720. At this time, the threshold length may be the one that determines the look up table which is acquired. Also, the threshold length may include a constant error, and may be varied by the user. In more detail, the HMD device 100 may set the threshold length to D 1. At this time, the HMD device 100 may change the size of D1 through the input of the user.

Also, as an example, the HMD device 100 may include a plurality of threshold lengths. In more detail, if the length of the input signal sensing area 520 is longer than D1 and shorter than D2 (not shown), the HMD device 100 may acquire different look up tables or may perform different interfaces. Also, if the length of the input signal sensing area 520 is longer than D2 and shorter than D3 (not shown), the HMD device 100 may acquire different look up tables or may perform different interfaces. In other words, the HMD device 100 may acquire a plurality of look up tables or perform a plurality of interfaces by controlling the threshold length.

Figure 8A:
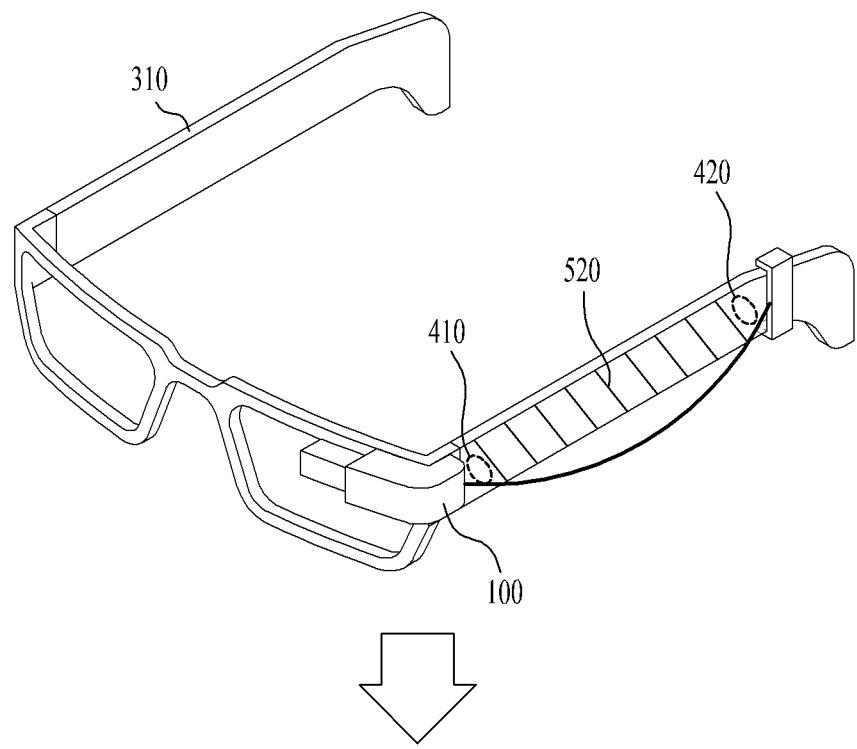
FIGS. 8a and 8b are diagrams illustrating a method for enabling an HMD device to acquire a look up table on the basis of a position of an input signal sensing area in accordance with one embodiment of the present specification.
Figure 8B:
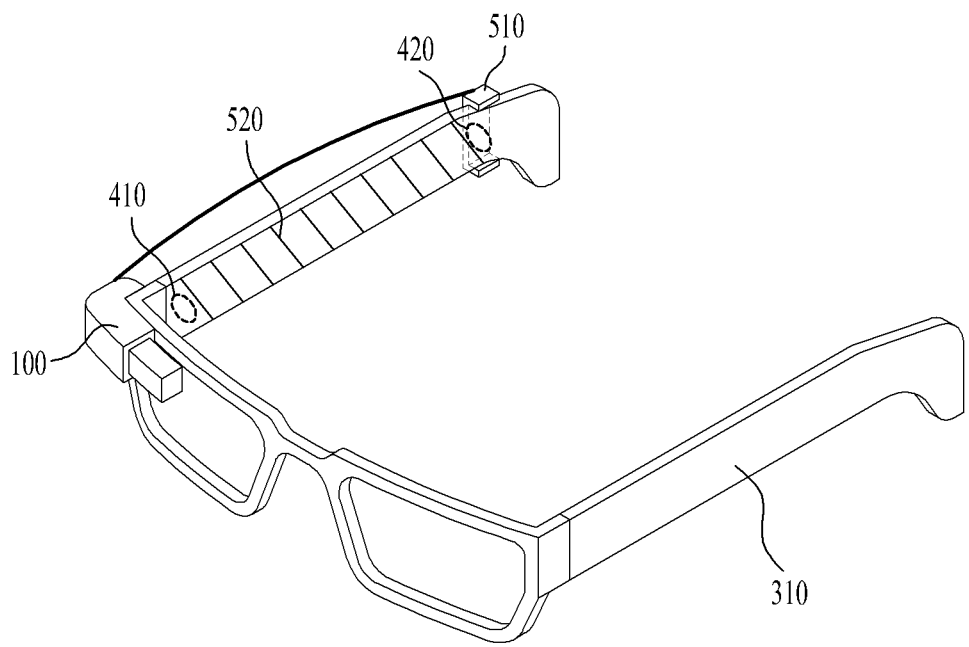
Figure 8B:
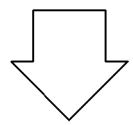

FIGS. 8a and 8b are diagrams illustrating a method for enabling an HMD device 100 to acquire a look up table on the basis of a position of an input signal sensing area in accordance with one embodiment of the present specification.

The input signal sensing area 520 may be located at the temple of the eye-glasses 310 to which the HMD device 100 is affixed. At this time, the temple of the eye-glasses 310 may mean a portion where a frame of the eye-glasses 310 is located on a profile of the user when the user wears the eye-glasses 310. The eye-glasses 310 to which the HMD device 100 is affixed may include the left temple and the right temple.

If the HMD device 100 is affixed to the eye-glasses 310, the HMD device 100 may set different modes in accordance with the position of the eye-glasses 310. At this time, the modes may be different user interfaces. Also, as an example, the modes may have different look up tables at the same user interface, and are not limited to the aforementioned embodiment.

For example, if the input signal sensing area 520 is located at the left temple, the HMD device 100 may set a left temple mode. In more detail, the HMD device 100 may set the left temple mode if the HMD device 100 is affixed to the left lens and the input signal sensing area 520 is located at the left temple as the current reception unit 510 is located at the left temple.

Also, if the input signal sensing area 520 is located at the right temple, the HMD device 100 may set a right temple mode. In more detail, the HMD device 100 may set the right temple mode if the HMD device 100 is affixed to the right lens and the input signal sensing area 520 is located at the right temple as the current reception unit 510 is located at the right temple. At this time, in case of the left temple mode, the HMD device 100 may acquire a first look up table 810. Also, in case of the right temple mode, the HMD device 100 may acquire a second look up table 820. In other words, the HMD device 100 may be operated at a different mode depending on the position of the input signal sensing area 520, and may acquire different look up tables.

Also, as an example, the HMD device 100 may set an interface performed in the left temple mode differently from an interface performed in the right temple mode. In more detail, in case of the left temple mode, the HMD device 100 may perform an interface corresponding to menu selection. At this time, the HMD device 100 may acquire a control input on the basis of the first look up table 810. Also, in case of the right temple mode, the HMD device 100 may perform an interface that plays music. At this time, the HMD device 100 may acquire a control input on the basis of the second look up table 820.

Also, as an example, the HMD device 100 may set the interface performed in the left temple mode equally to the interface performed in the right temple mode, and may set the look up tables differently from each other. The HMD device 100 may set the interfaces and the look up tables without limitation to the aforementioned embodiment.

FIG. 8a is a diagram illustrating the first look up table 810 acquired by the HMD device 100 in case of the left temple mode. In case of the left temple mode, the HMD device 100 may perform a first interface. At this time, the first interface may be the interface predetermined by the HMD device 100. Also, the first interface may be the interface predetermined by the user. If the HMD device 100 performs the first interface, the HMD device 100 may acquire the first look up table 810. If a first input signal 830 is forwarded to the HMD device 100, the HMD device 100 may acquire a control input of one-click on the basis of the first look up table 810. At this time, the first input signal 830 may be a control input generated when the user touches the eye-glasses 310 to which the HMD device 100 is affixed, one time.

Also, if a second input signal 840 is forwarded to the HMD device 100, the HMD device 100 may acquire a control input of double-click on the basis of the first look up table 810. At this time, the second input signal 840 may be a control input generated when the user touches the same position of the eye-glasses 310 to which the HMD device 100 is affixed, twice.

Also, if a third input signal 850 is forwarded to the HMD device 100, the HMD device 100 may acquire a control input of a slide on the basis of the first look up table 810. At this time, the third input signal 850 may be a control input generated when the user touches the eye-glasses 310 to which the HMD device 100 is affixed, through a slide.

In other words, the HMD device 100 may receive the input signal, and may acquire the control input on the basis of the first look up table 810. At this time, the input signal is not limited to the aforementioned embodiment, and may be varied and set by the user or the HMD device 100.

FIG. 8b is a diagram illustrating the second look up table 820 acquired by the HMD device 100 in case of the right temple mode. In case of the right temple mode, the HMD device 100 may perform a second interface. At this time, the second interface may be the interface that plays music. However, the second interface may be the interface set by the HMD device 100 or the user, and is not limited to the aforementioned embodiment.

If the HMD device 100 performs the second interface that plays music, the HMD device 100 may acquire the second look up table 820. If a first input signal 830 is forwarded to the HMD device 100, the HMD device 100 may acquire a control input, which plays music, on the basis of the second look up table 820. At this time, the first input signal 830 may be a control input generated when the user touches the eye-glasses 310 to which the HMD device 100 is affixed, one time.

Also, if a second input signal 840 is forwarded to the HMD device 100, the HMD device 100 may acquire a control input, which stops music, on the basis of the second look up table 820. At this time, the second input signal 840 may be a control input generated when the user touches the same position of the eye-glasses 310 to which the HMD device 100 is affixed, twice.

Also, if a third input signal 850 is forwarded to the HMD device 100, the HMD device 100 may acquire a control input, which forwards current music to next music, on the basis of the second look up table 820. At this time, the third input signal 850 may be a control input generated when the user touches the eye-glasses 310 to which the HMD device 100 is affixed, through a slide.

In other words, the HMD device 100 may receive the input signal, and may acquire the control input on the basis of the second look up table 820. At this time, the input signal is not limited to the aforementioned embodiment, and may be varied and set by the user or the HMD device 100.

Figure 9A:
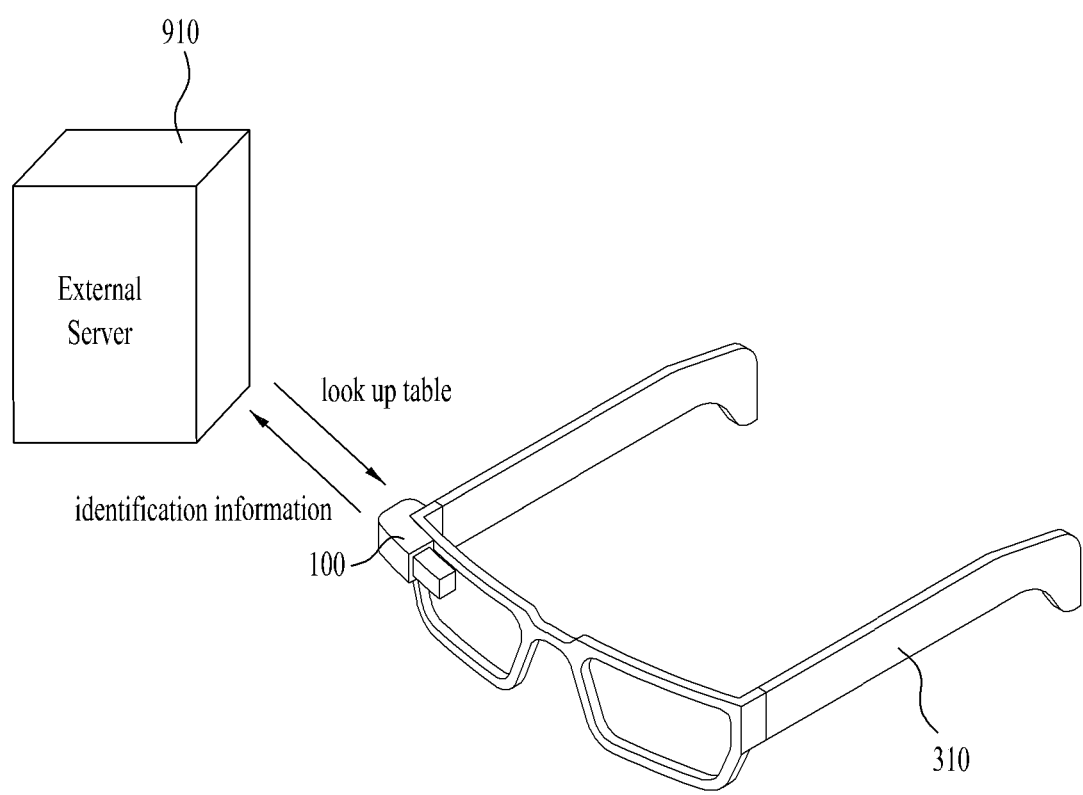
FIGS. 9a and 9b are diagrams illustrating a method for enabling an HMD device to acquire a look up table in accordance with one embodiment of the present specification.
Figure 9B:
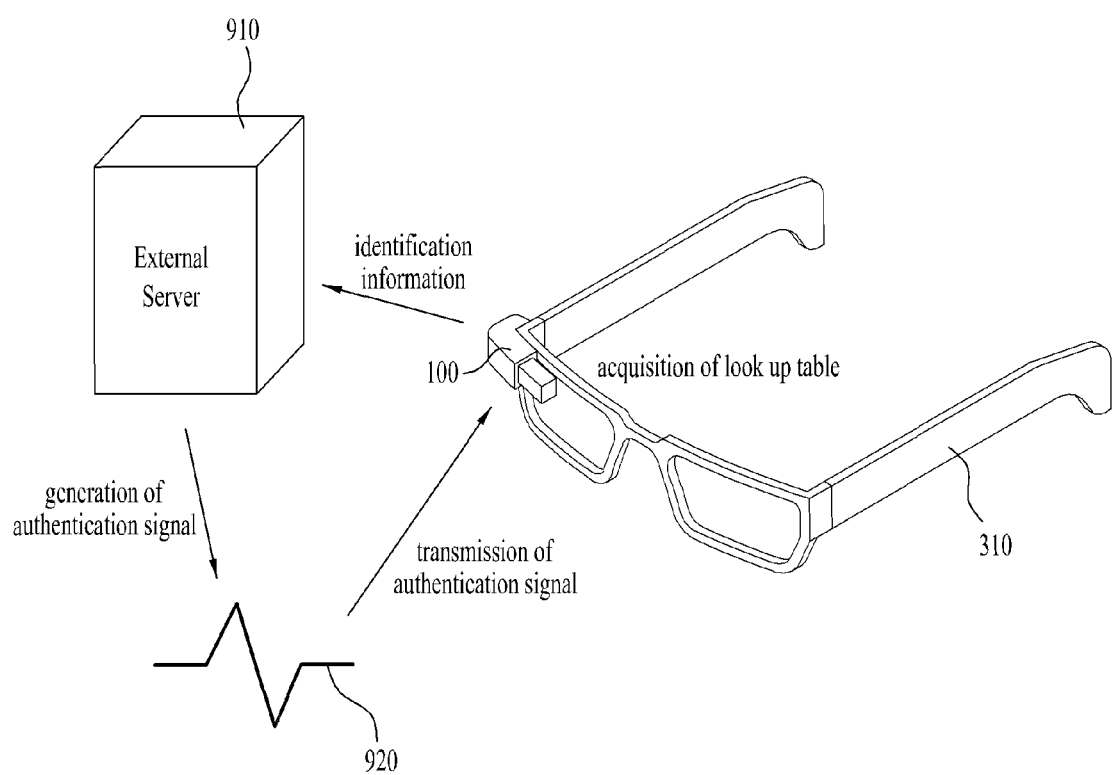

FIGS. 9a and 9b are diagrams illustrating a method for enabling an HMD device 100 to acquire a look up table in accordance with one embodiment of the present specification.

The HMD device 100 may further include a communication unit (not shown) that transmits and receives data. At this time, the communication unit may perform communication by using various protocols to transmit and receive data. Also, the communication unit may transmit and receive digital data such as contents by accessing a network through the wire or wireless.

The HMD device 100 may acquire a look up table on the basis of identification information. At this time, the HMD device 100 may transmit the identification information to an external server 910 by using the communication unit. At this time, the external server 910 may be a server that may exchange data with the HMD device 100 by using the communication unit. For example, the external server 910 may be an authentication authority that perform authentication. Also, as an example, the external server 910 may be a separate server set by the user. At this time, the user may perform authentication for the HMD device 100 by using the external server 910, and may use the HMD device 100 if the HMD device 100 is authenticated. Since the detachable HMD device 100 is detachably provided, the HMD device 100 may be used by a plurality of users, and the users may perform authentication by using a separate external server to identify their data and other security information.

Referring to FIG. 9a, if the HMD device 100 transmits identification information to the external server 910, the external server 910 may transmit the look up table to the HMD device 100 on the basis of the transmitted identification information. In other words, the HMD device 100 may acquire the look up table through the external server 910. As a result, the HMD device 100 may acquire the look up table only if the HMD device 100 is authenticated by the external server 910, and may improve a security level. Also, since the HMD device 100 is manufactured in a micro shape, its space for storing data may be small. Accordingly, the HMD device 100 may store a plurality of look up tables in the external server 910 and acquire information on a look up table, which is required, from the external server 910. Also, for example, the HMD device 100 may update the look up table by using the external server 910.

Referring to FIG. 9b, the HMD device 100 may perform authentication by using the external server 910 and acquire the look up table. At this time, the external server 910 may be an authenticated authority. Also, the external server 910 may be a server set by the user. In more detail, the HMD device 100 may acquire identification information and transmit the identification information to the external server 910. Also, the HMD device 100 may generate an authentication signal 920 on the basis of the identification information. At this time, the authentication signal 920 may be a signal indicating that the HMD device 100 may acquire the look up table by using the eye-glasses 310 to which the HMD device 100 is affixed. In more detail, if the HMD device 100 acquires identification information, which cannot be recognized by the HMD device 100, the external server 910 may not generate the authentication signal 920 on the basis of the identification information received from the HMD device 100. At this time, the HMD device 100 may not acquire the look up table on the basis of the identification information. The authentication signal 920 may be a signal indicating that the HMD device 100 may acquire the look up table on the basis of the identification information and perform a function in accordance with a control input.

The external server 910 may generate the authentication signal 920 if the identification information is received. Also, as another example, the external server 910 may generate the authentication signal 920 if information on a security key is received from the HMD device 100 together with the identification information. At this time, the security key may mean a value which is predetermined and may mutually be authenticated between the external server 910 and the HMD device 100. As a result, the user may improve a security level for use of the HMD device 100.

If the external server 910 generates the authentication signal 920 on the basis of the identification information, the external server 910 may transmit the authentication signal 920 to the HMD device 100. If the HMD device 100 receives the authentication signal 920, the HMD device 100 may acquire the look up table on the basis of the authentication signal 920 and acquire a control input for the input signal.

Also, in accordance with the present specification, the external server 910 may update identification information that may be acquired by the HMD device 100. In more detail, the external server 910 may transmit identification information on new eye-glasses to the HMD device 100. At this time, the HMD device 100 may recognize the new eye-glasses 310 on the basis of the transmitted identification information. As a result, the HMD device 100 may update identification information on the eye-glasses 310 to which the HMD device 100 may be affixed.

Also, as another example, the external server 910 may update the look up table acquired by the HMD device 100. In more detail, the user may acquire the look up table for the eye-glasses having the same identification information by using the external server 910. At this time, the HMD device 100 may receive the updated look up table from the external server 910 and acquire the control input in accordance with the received look up table. In other words, the user may control the look up table and the control input for the HMD device 100 by using the external server 910.

Figure 10:
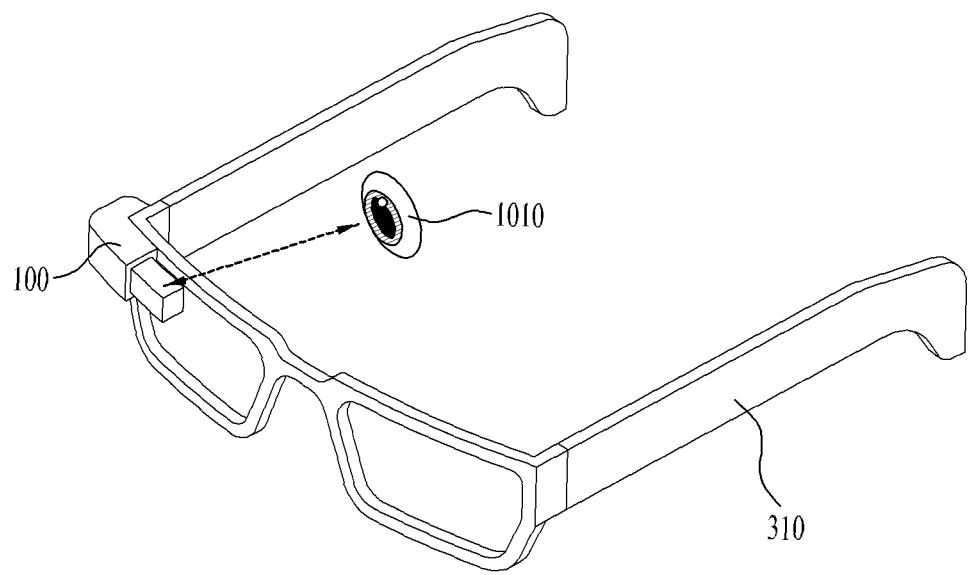
FIG. 10 is a diagram illustrating a method for enabling an HMD device to adjust a focus on the basis of a view of a user in accordance with one embodiment of the present specification.

FIG. 10 is a diagram illustrating a method for enabling an HMD device 100 to adjust a focus on the basis of a view of a user in accordance with one embodiment of the present specification.

If the HMD device 100 is affixed to the eye-glasses 310, the HMD device 100 may adjust a focus of visual information which is displayed on the basis of identification information of the eye-glasses 310. The eye-glasses 310 to which the HMD device 100 is affixed have their respective features. In more detail, the eye-glasses 310 to which the HMD device 100 is affixed may have their respective lens sizes and thicknesses different from one another. At this time, a user 1010 may receive visual information displayed by the HMD device 100 through the lens of the eye-glasses 310. Accordingly, the HMD device 100 may adjust the focus on the visual information which is displayed by considering size and thickness of the lens of the eye-glasses 310 worn by the user 1010. In other words, the HMD device 100 may provide the visual information in such a manner that focuses different from each other may be provided to each user 1010. At this time, the HMD device 100 may adjust the focus on the visual information on the basis of the thickness and the size of the lens of the eye-glasses 310. Also, as an example, the HMD device 100 may adjust the focus on the visual information which is displayed by using at least one of eyesight information of the user 1010, a distance between eyes of the user and the HMD device 100 and the position where the HMD device 100 is affixed to the eye-glasses.

Also, as an example, the HMD device 100 may acquire information on corrected eyesight of the user 1010 and adjust the focus of the displayed visual information on the basis of the corrected eyesight. In more detail, the HMD device 100 may acquire the corrected eyesight through a user input. At this time, the corrected eyesight may be eyesight of the user when the user wears the eye-glasses to which the HMD device 100 is affixed. The HMD device 100 may adjust the focus on the visual information by adjusting the acquired corrected eyesight and the distance between the HMD device 100 and eyes of the user.

Figure 11A:
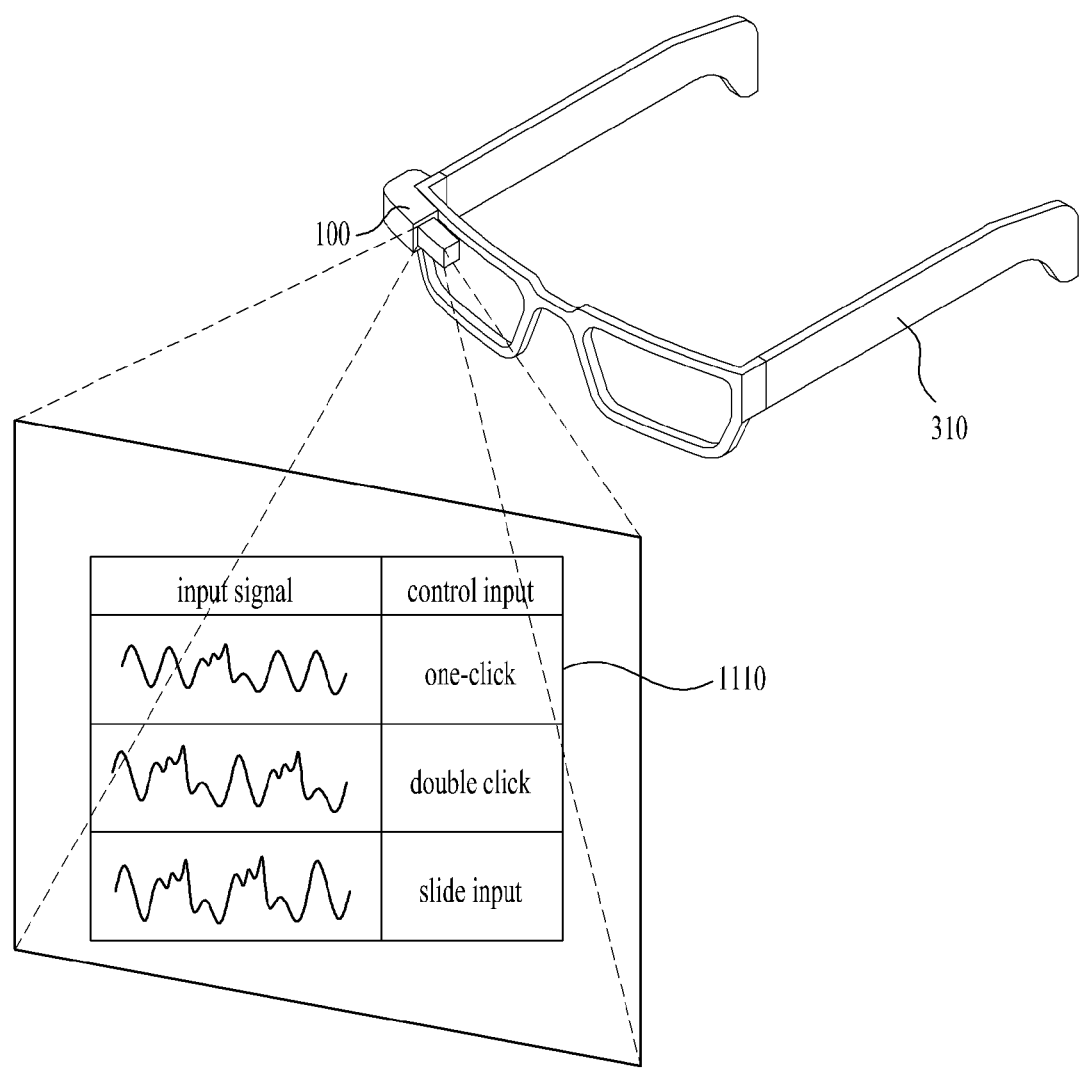
FIGS. 11a and 11b are diagrams illustrating a method for enabling an HMD device to display visual information in accordance with one embodiment of the present specification.
Figure 11B:
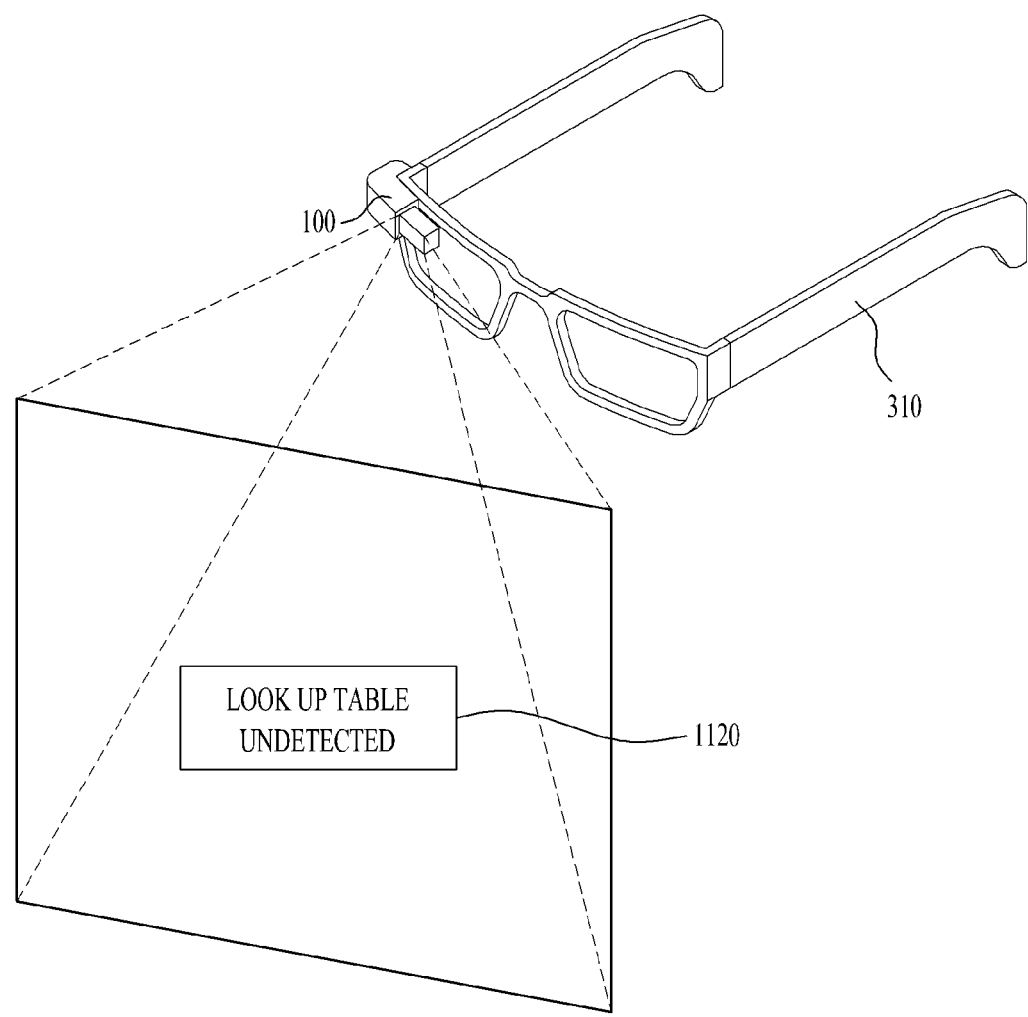

FIGS. 11a and 11b are diagrams illustrating a method for enabling an HMD device 100 to display visual information in accordance with one embodiment of the present specification.

The HMD device 100 may acquire a specific one of a plurality of look up tables on the basis of identification information. At this time, the HMD device 100 may display information on the acquired one of the plurality of look up tables. Also, if the HMD device 100 fails to acquire the look up table, the HMD device 100 may display information on that the look up table is not acquired. As a result, the user may identify whether the HMD device 100 affixed to the eye-glasses 310 may perform the control input of the user.

Referring to FIG. 11a, the HMD device 100 may acquire the look up table 1110 on the basis of the identification information. At this time, the HMD device 100 may display the look up table 1110. The user may control the HMD device 100 through a touch input on the basis of the look up table 1110 which is displayed.

Referring to FIG. 11b, if the HMD device 100 does not acquire the look up table, the HMD device 100 may display recognition error information 1120. At this time, the recognition error information 1120 may be information corresponding to the case where the HMD device 100 fails to acquire the identification information of the eye-glasses 310. Also, as an example, the recognition error information 1120 may be information corresponding to the case where the HMD device 100 fails to acquire a look up table corresponding to the identification information. As another example, the recognition error information 1120 may be information corresponding to the case where the HMD device 100 fails to acquire a control input corresponding to an input signal from the look up table. In other words, when the HMD device 100 cannot perform the control input of the user, the HMD device 100 may display the recognition error information 1120. Also, as an example, the HMD device 100 may forward the error recognition information 1120 to the user as a feedback. At this time, the feedback may include, but not limited to, at least one of a visual feedback, an audio feedback, and a tactile feedback.

Figure 12:
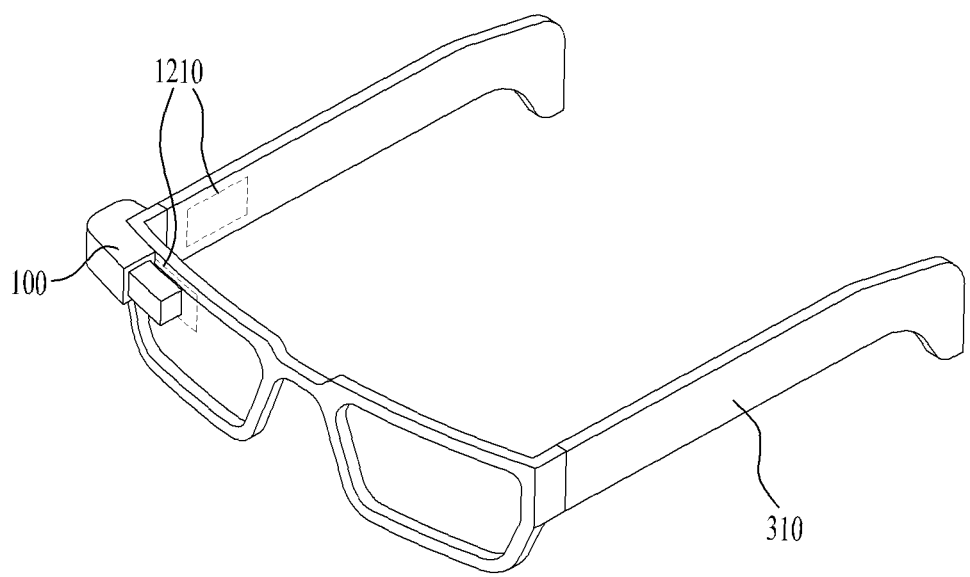
FIG. 12 is a diagram illustrating an indicator displayed on eye-glasses to which an HMD device is affixed in accordance with one embodiment of the present specification.

FIG. 12 is a diagram illustrating an indicator 1210 displayed on eye-glasses 310 to which an HMD device 100 is affixed in accordance with one embodiment of the present specification.

If the HMD device 100 is affixed to the eye-glasses 310, the HMD device 100 may be affixed to several parts of a frame of the eye-glasses. For example, the HMD device 100 may be affixed to a right lens part of the eye-glasses 310. For another example, the HMD device 100 may be affixed to a left lens part of the eye-glasses 310. However, since the HMD device 100 should provide the user with visual information in a state that the HMD device 100 is affixed to the eye-glasses 310, the HMD device 100 may be affixed to a portion where the user's eyes reach. For example, the HMD device 100 may be affixed to a portion where the user's eyes reach most nearly. At this time, the eye-glasses 310 may include the indicator 1210 that displays the portion to which the HMD device 100 is affixed. In this case, the indicator 1210 may be displayed as a groove structure so that the HMD device 100 may be affixed to the eye-glasses 310. In more detail, the indicator 1210 may be displayed as a groove structure of the eye-glasses 310, whereby the HMD device 100 may be affixed to the indicator 1210. Also, the indicator 1210 may be displayed at the left lens part or the right lens part of the eye-glasses 310. As a result, the HMD device 100 may be affixed to the indicator 1210 part of the eye-glasses 310 and then may provide the user with the visual information.

Also, for example, the indicator 1210 may indicate the portion where the current reception unit 510 is affixed. In more detail, the indicator 1210 may be displayed as a groove structure so that the current reception unit 510 may be affixed thereto. At this time, for example, the indicator 1210 may be displayed on the basis of the length of the aforementioned input signal sensing area 520. In other words, the indicator 1210 may indicate the threshold length of the input signal sensing area 520 to allow the user to easily identify the look up table acquired by the HMD device 100.

FIG. 13 is a flow chart illustrating a method for controlling a detachable HMD device 100 in accordance with one embodiment of the present specification. The HMD device 100 may detect that the HMD device 100 is affixed to the eye-glasses (S1310). At this time, as described with reference to FIG. 1, the HMD device 100 may detect whether the HMD device 100 has been affixed to the eye-glasses, by using the affixed detached sensor unit 120.

At this time, as an example, the HMD device 100 may generate an electromagnetic pattern. The HMD device 100 may generate a current, generate various electromagnetic patterns by controlling an occurrence period of the current, a duration time of the current and strength of the current, and output the electromagnetic pattern to the affixed portion. The HMD device 100 may sense variation of the electromagnetic pattern output from the affixed portion by using the affixed detached sensor unit 120. In more detail, the eye-glasses to which the HMD device 100 is affixed may be coated with a material having conductivity. At this time, the material having conductivity may be, but not limited to, a material, such as Cu, Al, Au, or carbon nanotube, which is coated in the eye-glasses to flow a micro current. The HMD device 100 may detect that the HMD device 100 has been affixed to the eye-glasses by sensing that the output electromagnetic pattern is varied by the eye-glasses coated with the conductive material. Also, the HMD device 100 may detect that the eye-glasses has been affixed to the HMD device 100 by sensing magnetic field varied by the eye-glasses coated with the conductive material. Also, the HMD device 100 may detect that the HMD device 100 has been affixed to the eye-glasses by using a radio frequency identification (RFID) signal, a bar code, a QR code, etc. In accordance with the present specification, the HMD device 100 may include, but not limited to, a sensor that may detect that the HMD device 100 is affixed to the eye-glasses.

Afterwards, the HMD device 100 may acquire identification information of the affixed eye-glasses 310 (S1320). At this time, as described with reference to FIG. 6, the identification information may mean information identified per eye-glasses 310 to which the HMD device 100 is affixed. In more detail, the identification information may include at least one of a type of the eye-glasses, appearance of the eye-glasses, parts of the eye-glasses, a material coated in the eye-glasses, conductivity of the eye-glasses, a length of an area of the eye-glasses coated with a conductive material, a lens size of the eye-glasses, and a thickness of the eye-glasses. In addition, the identification information may include information on the eye-glasses to which the HMD device 100 is affixed. The identification information is not limited to the aforementioned embodiment.

Also, the HMD device 100 may acquire he identification information 640 by using at least one of variation of an electric signal, the RFID signal, the bar code, and the QR code. Also, the HMD device 100 may acquire the identification information 640 by means of a value which is predetermined between the eye-glasses 310 and the HMD device 100. The identification information 640 may be acquired without limitation to the aforementioned embodiment.

Afterwards, the HMD device 100 may acquire a look up table related to the identification information (S1330). At this time, as described with reference to FIG. 6b, the look up table 650 may be a set of predetermined values corresponding to a given input signal. In more detail, the look up table 650 may be a value corresponding to a control input matched with the input signal which is generated when the user 430 touches the eye-glasses 310. Also, the look up table 650 may be set on the basis of the acquired identification information 640. For example, the look up table 650 may be set differently depending on the conductive material coated in the eye-glasses 310 and the length of the eye-glasses coated with the conductive material among the identification information 640. Also, as described with reference to FIGS. 7a to 7c, the HMD device 100 may set the look up table on the basis of the length of the input signal sensing area 520. At this time, as described above, the input signal sensing area 520 may be an area between the first contact point 410 and the second contact point 420. In other words, the input signal sensing area 520 may be an area where a current flows in the eye-glasses 310, and may mean an area where the input signal touched by the user may be detected. Also, as described with reference to FIGS. 8a and 8b, the HMD device 100 may set the look up table on the basis of the position of the input signal sensing area 520. Also, the HMD device 100 may acquire the look up table from the external server.

Afterwards, the HMD device 100 may acquire the input signal generated when the eye-glasses to which the HMD device 100 is affixed is touched (S1340). At this time, as described with reference to FIG. 1, the HMD device 100 may detect the input signal varied when the eye-glasses are touched using the sensor unit. In more detail, if the eye-glasses are touched, the HMD device 100 may sense that electric conductivity or electromagnetic pattern of the conductive material coated in the eye-glasses is varied, thereby detecting the input signal corresponding to the touched area of the eye-glasses.

Also, as an example, the HMD device 100 may include a first contact point for applying a current and a second contact point for receiving the current applied from the first contact point. As another example, the HMD device 100 may include a current reception unit. At this time, the current reception unit may receive the current applied from the first contact point. In more detail, the current reception unit may include the second contact point. The current reception unit may control the input signal sensing area where the input signal is detected, by controlling the position of the second contact point.

Afterwards, the HMD device 100 may acquire the control input related to the input signal from the look up table (S1350). At this time, as described with reference to FIG. 6b, the control input may be a control input for an interface performed by the HMD device 100. For example, if the input signal generated when the user touches the eye-glasses 310 one time is detected, the HMD device 100 may acquire the control input, which performs one-click, from the look up table 650. Also, if the input signal generated when the user touches the eye-glasses 310 through a slide is detected, the HMD device 100 may acquire the control input, which performs a slide, from the look up table 650. Also, if the user touches two points at the same time, the HMD device 100 may acquire a control input corresponding to multi-touch from the look up table 650. At this time, the look up table 650 may be set to include the control input corresponding to the aforementioned embodiments. Also, the look up table 650 may be varied by the user or the HMD device 100 without limitation to the aforementioned embodiment.

Afterwards, the HMD device 100 may perform a function corresponding to the control input (S1360). At this time, as described with reference to FIG. 6b, the function may be a command that controls the user interface performed by the HMD device 100. For example, if the HMD device 100 performs the user interface that plays music and acquires the control input, which performs one-click, from the look up table 650, the HMD device 100 may perform a function that stops the music, which is being played, or replays the music. For another example, if the HMD device 100 displays a menu and acquires the control input, which performs one-click, from the look up table 650, the HMD device 100 may perform a function that selects an icon in a menu. In other words, the HMD device 100 may control the function performed by the control input by considering the user interface which is performed.

Although the description may be made for each of the drawings for convenience of description, the embodiments of the respective drawings may be incorporated to achieve a new embodiment. Also, a computer readable recording medium where a program for performing the embodiments is recorded may be designed in accordance with the need of the person skilled in the art within the scope of the present specification.

Also, the HMD device 100 and the method for controlling the same according to the present specification are not limited to the aforementioned embodiments, and all or some of the aforementioned embodiments may selectively be configured in combination so that various modifications may be made in the aforementioned embodiments.

Meanwhile, the HMD device 100 and the method for controlling the same according to the present specification may be performed in a recording medium, which can be read by a controller provided in a network device, as a code that can be read by the controller. The recording medium that can be read by the controller includes all kinds of recording media in which data that can be read by the controller are stored. Examples of the recording medium include a ROM, a RAM, a CD-ROM, a magnetic tape, a floppy disk, and an optical data memory. Also, another example of the recording medium may be performed in a type of carrier wave such as transmission through Internet. Also, the recording medium that can be read by the controller may be distributed in a computer system connected thereto through the network, whereby codes that can be read by the controller may be stored and performed in a distributive mode.

Also, although the preferred embodiments of the present specification have been described, it will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, both the product invention and the method invention have been described, and description of both inventions may be made complementally if necessary.

What is claimed is:

1. A detachable head mounted display (HMD) device comprising:
    a display unit configured to display visual information;
    a detached sensor unit configured to detect whether the HMD device has been affixed to eye-glasses, wherein the HMD device is separable from and mountable to a lens or temple part of the eye-glasses;
    a sensor unit configured to detect an input signal generated when the eye-glasses to which the HMD device is affixed are touched; and
    a controller configured to control the display unit, the detached sensor unit and the sensor unit,
    wherein the controller is further configured to:
    when the HMD device detects that the HMD device is affixed to the eye-glasses, acquire identification information of the eye-glasses, acquire a look up table related to the identification information, receive the detected input signal from the sensor unit, acquire a control input related to the input signal from the look up table, perform a function corresponding to the control input, and adjust a focus of the visual information, which is displayed, on the basis of the identification information of the eye-glasses to which the HMD device is affixed.

2. The HMD device according to claim 1, further comprising a first contact point for applying a current to the eye-glasses, and a second contact point for receiving the current applied from the first contact point,
    wherein the sensor unit detects the input signal generated when the eye-glasses to which the HMD device is affixed are touched, and
    wherein the input signal is detected based on the current applied from the first contact point and received by the second contact point.

3. The HMD device according to claim 2, further comprising a current reception unit,
    wherein the controller is further configured to:
    when the HMD device detects that the current reception unit is affixed, set the second contact point to a position where the current reception unit is affixed.

4. The HMD device according to claim 3, wherein the controller is further configured to set an area between the first contact point and the second contact point as an input signal sensing area, which detects the input signal, and
    wherein the input signal is detected based on the position where the current reception unit is affixed.

5. The HMD device according to claim 4, wherein the controller is further configured to determine the look up table on the basis of a length of the input signal sensing area,
    wherein when the length of the input signal sensing area is less than a threshold length, detect the control input related to the input signal from a first look up table, and
    wherein when the length of the input signal sensing area is more than the threshold length, detect the control input related to the input signal from a second look up table.

6. The HMD device according to claim 4, wherein the eye-glasses comprise a left temple and a right temple,
    wherein the controller is further configured to:
    when the input signal sensing area is located at the left temple, set a left temple mode,
    when the input signal sensing area is located at the right temple, set a right temple mode and,
    wherein the control input related to the input signal is acquired from the first look up table in the left temple mode and the control input related to the input signal is acquired from the second look up table in the right temple mode.

7. The HMD device according to claim 1, wherein the controller is further configured to acquire the identification information by using at least one of a bar code, a QR code and an RFID signal.

8. The HMD device according to claim 7, wherein the identification information includes at least one of a material coated in the eye-glasses, conductivity of the eye-glasses, a length of an area of the eye-glasses coated with a conductive material, a lens size of the eye-glasses, and a thickness of the eye-glasses, and
    wherein the controller is further configured to determine the look up table on the basis of information included in the identification information.

9. The HMD device according to claim 1, further comprising a communication unit configured to transmit and receive the identification information, the look up table and an authentication signal.

10. The HMD device according to claim 9, wherein the controller is further configured to acquire the look up table related to the identification information from an external server by using the communication unit.

11. The HMD device according to claim 9, wherein the controller is further configured to transmit the identification information to the external sever, acquire the authentication signal transmitted from the external server on the basis of the identification information and,
    when the eye-glasses are authenticated on the basis of the authentication signal, acquire the look up table.

12. The HMD device according to claim 1, wherein the controller is further configured to:
when the HMD device detects that the HMD device is affixed to the eye-glasses, acquire user information of a user of the eye-glasses.

13. The HMD device according to claim 12, wherein the controller is further configured to generate a folder for storing data on the basis of the user information, and stores the data, which include information corresponding to the function performed by the user in a state that the HMD device is affixed to the eye-glasses, in the folder.

14. The HMD device according to claim 1, wherein the eye-glasses further include an indicator indicating the position where the HMD device is affixed to the eye-glasses.

15. The HMD device according to claim 1, wherein the controller is further configured to:
when a plurality of look up tables are provided, set the look up table matched with the identification information inputted by a user input.

16. The HMD device according to claim 1, wherein the sensor unit further detects feature information on the eye-glasses to which the HMD device is affixed, and
wherein the controller is further configured to receive the detected feature information from the sensor unit, match the feature information with the identification information,
wherein when the identification information is matched with the feature information, maintain the look up table on the basis of the identification information, and
wherein when the identification information is not matched with the feature information, update the look up table on the basis of the feature information.

17. The HMD device according to claim 1, wherein the controller is further configured to control a user interface, which is displayed in the display unit, to correspond to the function.

18. The HMD device according to claim 1, wherein a frame surface of the eye-glasses is coated with a material having conductivity.

19. A method for controlling a detachable head mounted display (HMD) device, the method comprising:
detecting that the HMD device is affixed to eye-glasses, wherein the HMD device is separable from and mountable to a lens or temple part of the eye-glasses;
acquiring identification information of the eye-glasses;
acquiring a look up table related to the identification information;
receiving an input signal generated when the eye-glasses to which the HMD device is affixed are touched, from the sensor unit;
acquiring a control input related to the input signal from the look up table;
performing a function corresponding to the control input; and
adjusting a focus of the visual information, which is displayed, on the basis of the identification information of the eye-glasses to which the HMD device is affixed.

* * * * *